United States Patent
Maeno et al.

(10) Patent No.: US 8,164,078 B2
(45) Date of Patent: Apr. 24, 2012

(54) BEAM IRRADIATION DEVICE

(75) Inventors: Yoshiaki Maeno, Mizuho (JP);
Mitsutaka Yamaguchi, Gifu (JP)

(73) Assignees: Sanyo Electric Co., Ltd., Osaka (JP);
Sanyo Optec Design Co., Ltd., Tokyo (JP)

( * ) Notice: Subject to any disclaimer, the term of this patent is extended or adjusted under 35 U.S.C. 154(b) by 221 days.

(21) Appl. No.: 12/729,587

(22) Filed: Mar. 23, 2010

(65) Prior Publication Data

US 2010/0243861 A1    Sep. 30, 2010

(30) Foreign Application Priority Data

Mar. 26, 2009    (JP) .................. 2009-077740

(51) Int. Cl.
*G01J 1/32* (2006.01)
*G01C 3/08* (2006.01)
(52) U.S. Cl. .................. 250/559.38; 356/5.09
(58) Field of Classification Search ............ 250/559.13, 250/559.29, 559.38; 356/4.01, 4.07, 5.01, 356/5.09
See application file for complete search history.

(56) References Cited

U.S. PATENT DOCUMENTS 7,701,589 B2*   4/2010   Takeda et al. ............. 356/511
8,000,169 B2*   8/2011   Touge ..................... 367/98

FOREIGN PATENT DOCUMENTS

JP    2009-14698 A    1/2009

* cited by examiner

*Primary Examiner* — Seung C Sohn
(74) *Attorney, Agent, or Firm* — Ditthavong Mori & Steiner, P.C.

(57) ABSTRACT

A beam irradiation device includes a photodetector which receives servo light; a signal processing section which generates a position detection signal based on a detection signal from the photodetector; and a control section which controls the laser light source and the actuator for beam scanning based on the position detection signal. The signal processing section performs a sampling operation with respect to the detection signal from the photodetector at two consecutive sampling timings. The signal processing section includes an A/D converting section which converts a difference between two sampling values obtained by the sampling operation into a digital signal, and a computing section which computes the position detection signal based on the digital signal from the A/D converting section.

5 Claims, 17 Drawing Sheets

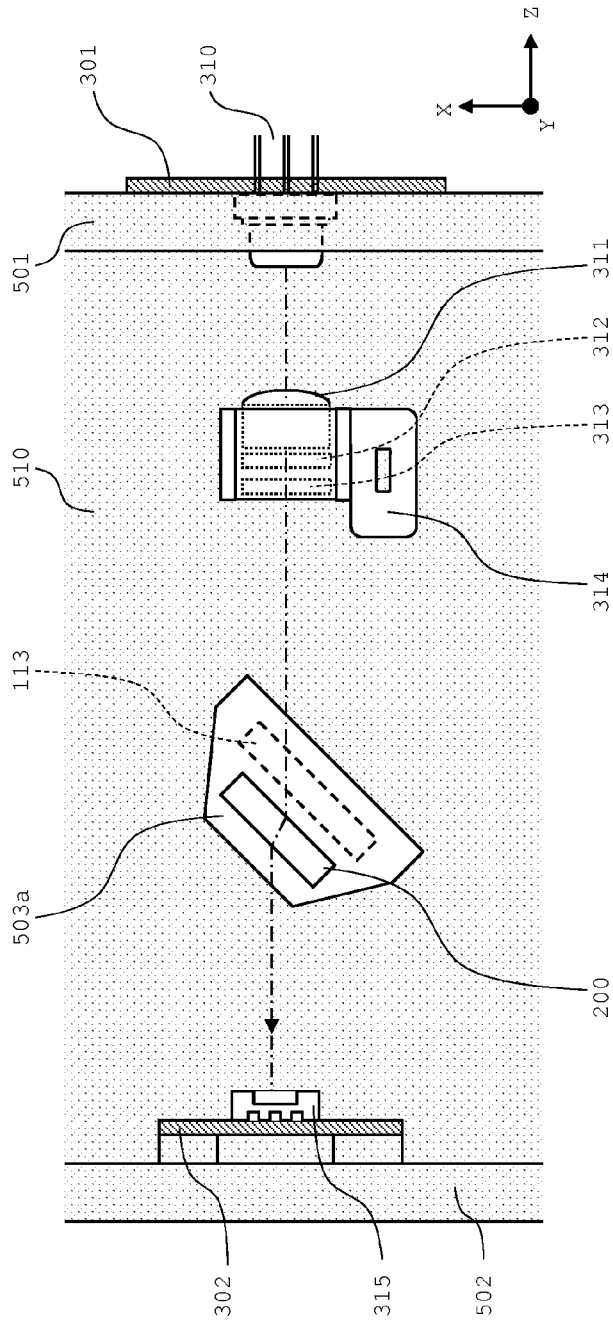
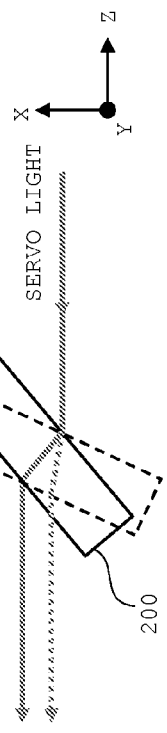
FIG. 3A
FIG. 3B

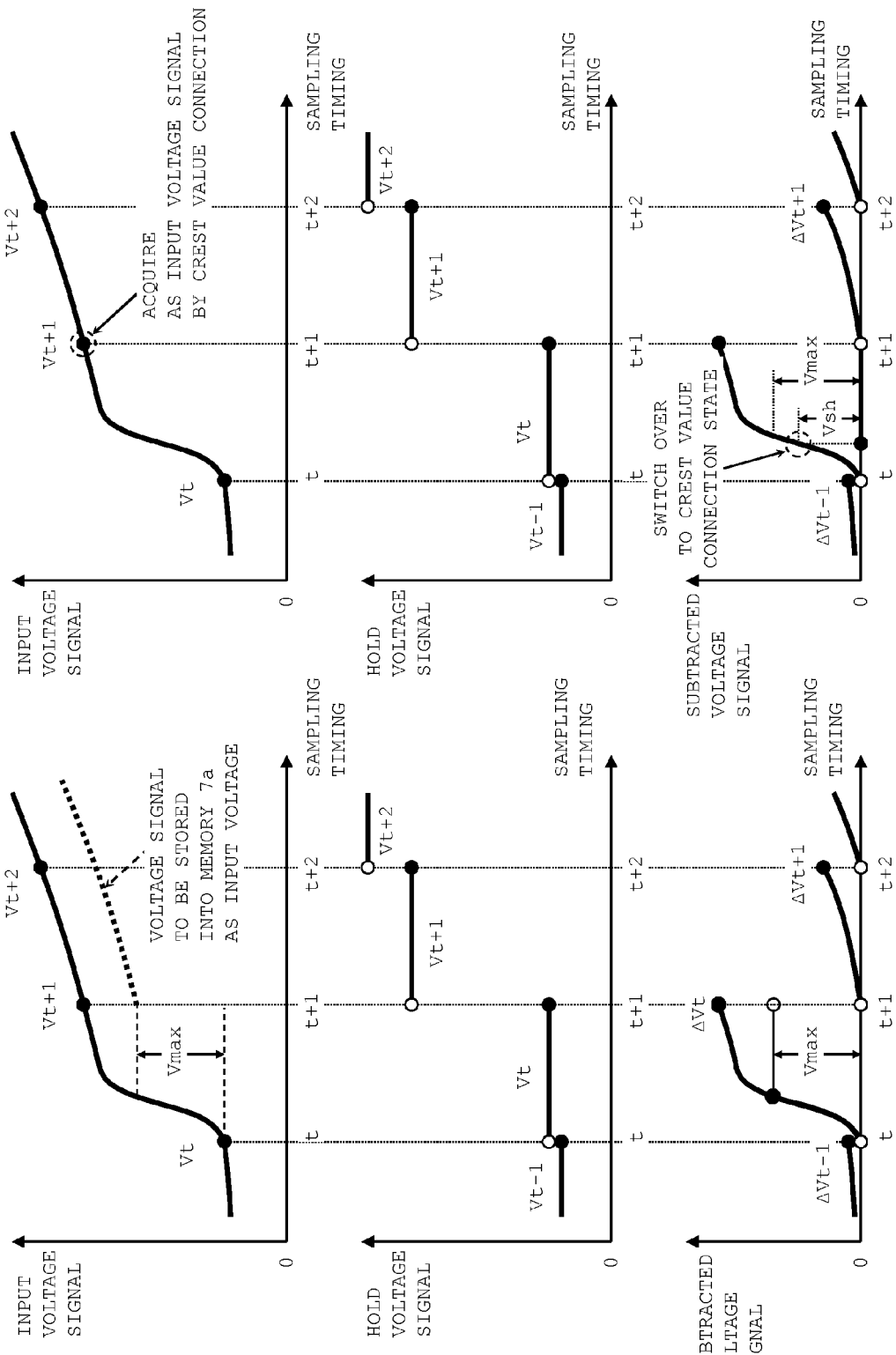

BEAM IRRADIATION DEVICE

This application claims priority under 35 U.S.C. Section 119 of Japanese Patent Application No. 2009-77740 filed Mar. 26, 2009, entitled "BEAM IRRADIATION DEVICE". The disclosure of the above application is incorporated herein by reference.

BACKGROUND OF THE INVENTION

1. Field of the Invention

The present invention relates to a beam irradiation device for irradiating laser light onto a targeted area, and more particularly to a beam irradiation device to be loaded in a so-called laser radar system for detecting presence or absence of an obstacle or a distance to the obstacle in a targeted area, based on reflection light obtained by irradiating laser light onto the targeted area.

2. Disclosure of Related Art

In recent years, a laser radar system for irradiating laser light in a forward direction with respect to a driving direction to detect presence or absence of an obstacle or a distance to the obstacle in a targeted area, based on a state of reflection light of the laser light, has been loaded in a family automobile or the like to enhance security in driving. Generally, the laser radar system is so configured as to scan a targeted area with laser light to detect presence or absence of an obstacle at each of scanning positions, based on presence or absence of reflection light at each of the scanning positions. The laser radar system is also configured to detect a distance to the obstacle at each of the scanning positions, based on a required time from an irradiation timing of laser light to a light receiving timing of reflection light at each of the scanning positions.

It is necessary to properly scan a targeted area with laser light, and properly detect each of scanning positions of laser light to enhance detection precision of the laser radar system. As an arrangement for scanning a targeted area with laser light, it is possible to employ an arrangement for driving a mirror about two axes. In the scan mechanism having the above arrangement, laser light is entered into the mirror obliquely with respect to a horizontal direction. Driving the mirror about two axes in a horizontal direction and a vertical direction allows for laser light to scan the targeted area.

In the scan mechanism having the above arrangement, a scanning position of laser light in a targeted area has a one-to-one correspondence to a pivotal position of a mirror. Accordingly, the scanning position of laser light can be detected by detecting the pivotal position of the mirror.

In the above arrangement, the pivotal position of the mirror can be detected by detecting a pivotal position of another mirror (servo mirror) which is pivotally moved with the mirror. Specifically, servo light is allowed to be entered into the servo mirror, and reflection light on the servo mirror is received on a PSD (Position Sensing Device). In this arrangement, servo light scans a surface on the PSD in accordance with a pivotal movement of the mirror. The pivotal position of the mirror is detected by detecting an incident position of servo light on the PSD based on a signal to be outputted from the PSD, whereby the scanning position of laser light in the targeted area is detected.

A signal to be outputted from the PSD at the time of pivotal movement of the mirror is continuously changed. Normally, the fluctuation range of the signal is considerably small, as compared with a crest value thereof. However, in the case where the position of servo light is detected based on a signal from the PSD, generally, a sampling value (a crest value) obtained by sampling the signal is subjected to A/D (Analog Digital) conversion, and a digital signal to be outputted by the A/D conversion is subjected to a computation processing. In the above arrangement, there is a problem that the resolution performance of an A/D conversion circuit is not effectively utilized at the time of A/D conversion, with the result that generation of a high-precision position detection signal is difficult or impossible.

SUMMARY OF THE INVENTION

A beam irradiation device according to an aspect of the invention includes: a laser light source which emits laser light; an actuator which scans a targeted area with the laser light, a servo optical system which emits servo light, and changes a propagating direction of the servo light in accordance with driving of the actuator; a photodetector which receives the servo light, and outputs a detection signal depending on a light receiving position of the servo light; a signal processing section which generates a position detection signal based on the detection signal; and a control section which controls the laser light source and the actuator based on the position detection signal. In the above arrangement, the signal processing section includes: a differential acquiring section which acquires a difference between two sampling values obtained by sampling the detection signal at two consecutive sampling timings; an A/D converting section which converts the difference into a digital signal; and a computing section which computes the position detection signal, based on the difference which has been converted into the digital signal by the A/D converting section.

BRIEF DESCRIPTION OF THE DRAWINGS

These and other objects, and novel features of the present invention will become more apparent upon reading the following detailed description of the embodiment along with the accompanying drawings.

FIGS. 3A and 3B are diagrams showing a servo optical system in the beam irradiation device in the embodiment.

FIGS. 11A and 11B are diagrams showing changes in respective voltage signals in the embodiment.

Figure 1:
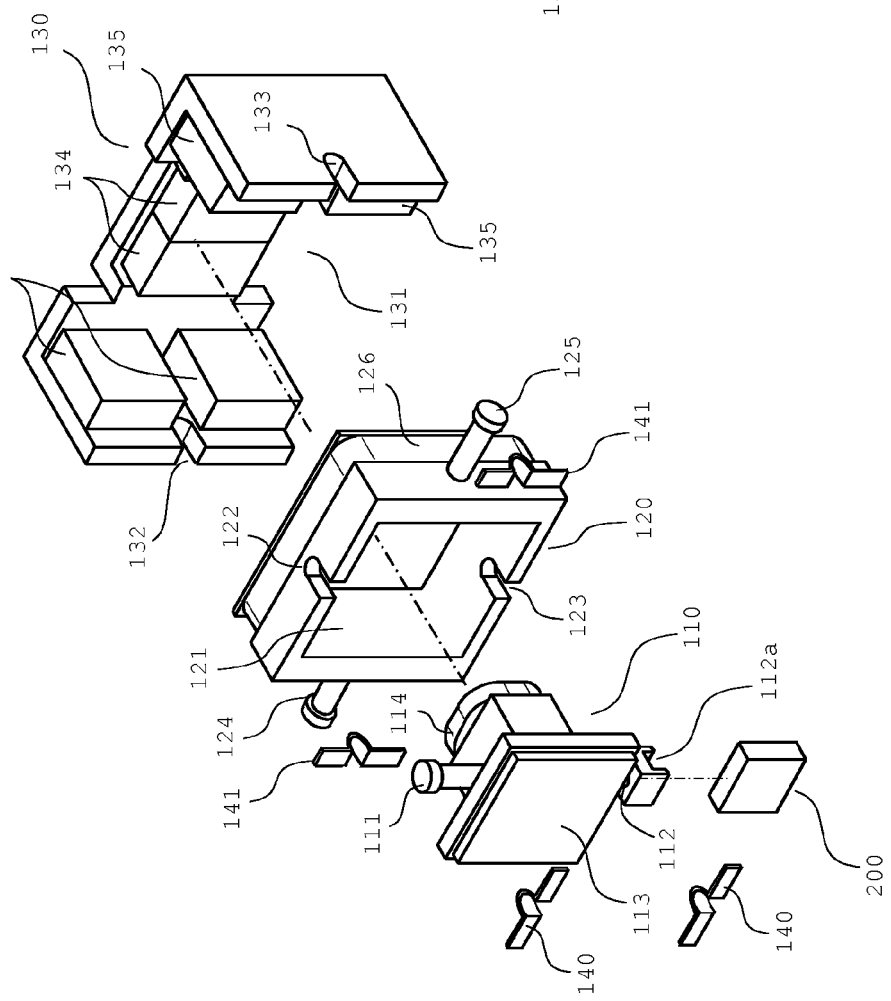
FIGS. 1A and 1B are diagrams showing an arrangement of a mirror actuator in an embodiment of the invention.

The drawings are provided mainly for describing the present invention, and do not limit the scope of the present invention.

DESCRIPTION OF PREFERRED EMBODIMENTS

In the following, an embodiment of the invention is described referring to the drawings.

An I/V conversion circuit 2, level adjusting circuits 3 through 6, and a PSD processing circuit 7 in the embodiment correspond to a signal processing section in the claims. A control circuit 8 in the embodiment corresponds to a control section in the claims. An S/H circuit 34 and the subtractor 35 in the embodiment correspond to a differential acquiring section in the claims. An A/D conversion circuit 38 in the embodiment corresponds to a first A/D converting section in the claims. A buffer 7f, an adder circuit 7g, a buffer 7e, a memory 7a, and a signal computing circuit 7b in the embodiment correspond to a first computing section in the claims. An A/D conversion circuit 37 in the embodiment corresponds to a second A/D converting section in the claims. A buffer 7c, the memory 7a, and the signal computing circuit 7b in the embodiment correspond to a second computing section in the claims. A selector 7d in the embodiment corresponds to a selecting section in the claims. A slit 316, a PD 317, an I/V conversion circuit 15, and an A/D conversion circuit 16 in the embodiment correspond to a position detecting section in the claims. The PSD processing circuit 7 in the embodiment corresponds to an error detecting section in the claims. A neutral position in the embodiment corresponds to a reference position in the claims.

FIGS. 1A and 1B are diagrams showing an arrangement of a mirror actuator 100 in an embodiment of the invention. FIG. 1A is an exploded perspective view of the mirror actuator 100, and FIG. 1B is a perspective view of the mirror actuator 100 in an assembled state.

Referring to FIG. 1A, the reference numeral 110 indicates a mirror holder. The mirror holder 110 is formed with a support shaft 111 having a retainer at an end thereof, and a support shaft 112 having a bracket portion 112a at an end thereof. The bracket portion 112a has a recess of a size substantially equal to a thickness of a transparent member 200, and an upper part of the transparent member 200 is mounted in the recess. A flat plate-shaped mirror 113 is mounted on a front surface of the mirror holder 110, and a coil 114 is mounted on a rear surface thereof. The coil 114 is wound in a rectangular shape.

As described above, the transparent member 200 of a parallel flat plate shape is mounted on the support shaft 112 through the bracket portion 112a. In this example, the transparent member 200 is mounted on the support shaft 112 in such a manner that two flat surfaces of the transparent member 200 are aligned in parallel to a mirror surface of the mirror 113.

The reference numeral 120 indicates a movable frame which pivotally supports the mirror holder 110 about axes of the support shafts 111 and 112. The movable frame 120 is formed with an opening 121 for accommodating the mirror holder 110 therein, and also with grooves 122 and 123 to be engaged with the support shafts 111 and 112 of the mirror holder 110. Support shafts 124 and 125 each having a retainer at an end thereof are formed on side surfaces of the movable frame 120, and a coil 126 is mounted on a rear surface of the movable frame 120. The coil 126 is wound in a rectangular shape.

The reference numeral 130 indicates a fixed frame which pivotally supports the movable frame 120 about axes of the support shafts 124 and 125. The fixed frame 130 is formed with a recess 131 for accommodating the movable frame 120 therein, and also with grooves 132 and 133 to be engaged with the support shafts 124 and 125 of the movable frame 120. Magnets 134 for applying a magnetic field to the coil 114, and magnets 135 for applying a magnetic field to the coil 126 are mounted on inner surfaces of the fixed frame 130. The grooves 132 and 133 each extends from a front surface of the fixed frame 130 to a position in a clearance between the upper and lower two magnets 135.

The reference numeral 140 indicates a pressing plate for pressing the support shafts 111 and 112 in a rearward direction to prevent the support shafts 111 and 112 of the mirror holder 110 from disengaging from the grooves 122 and 123 of the movable frame 120. The reference numeral 141 indicates a pressing plate for pressing the support shafts 124 and 125 in the rearward direction to prevent the support shafts 124 and 125 of the movable frame 120 from disengaging from the grooves 132 and 133 of the fixed frame 130.

In the case where the mirror actuator 100 is assembled, the support shafts 111 and 112 of the mirror holder 110 are engaged in the grooves 122 and 123 of the movable frame 120, and the pressing plate 140 is mounted on a front surface of the movable frame 120 in such a manner as to press front surfaces of the support shafts 111 and 112. Accordingly, the mirror holder 110 is pivotally supported on the movable frame 120.

After the mirror holder 110 is mounted on the movable frame 120 in the above-described manner, the support shafts 124 and 125 of the movable frame 120 are engaged in the grooves 132 and 133 of the fixed frame 130, and the pressing plate 141 is mounted on the front surface of the fixed frame 130 in such a manner as to press front surfaces of the support shafts 132 and 133. Accordingly, the movable frame 120 is pivotally mounted on the fixed frame 130. Thus, the mirror actuator 100 is assembled.

As the mirror holder 110 is pivotally rotated with respect to the movable frame 120 about the axes of the support shafts 111 and 112, the mirror 113 is pivotally rotated. Further, as the movable frame 120 is pivotally rotated with respect to the fixed frame 130 about the axes of the support shafts 124 and 125, the mirror holder 110 is pivotally rotated, and as a result, the mirror 113 is pivotally rotated with the mirror holder 110. Thus, the mirror holder 110 is pivotally supported in a two-dimensional direction about the axes of the support shafts 111 and 112, and the support shafts 124 and 125 orthogonal to each other, and the mirror 113 is pivotally rotated in the two-dimensional direction in accordance with the pivotal rotation of the mirror holder 110. During the pivotal rotation, the transparent member 200 mounted on the support shaft 112 is also pivotally rotated in accordance with the pivotal rotation of the mirror 113.

In the assembled state shown in FIG. 1B, the positions and the polarities of the two magnets 134 are adjusted in such a manner that a force for pivotally rotating the mirror holder 110 about the axes of the support shafts 111 and 112 is generated by application of a current to the coil 114. Accordingly, in response to application of a current to the coil 114, the mirror holder 110 is pivotally rotated about the axes of the support shafts 111 and 112 by the electromagnetic driving force generated in the coil 114.

Further, in the assembled state shown in FIG. 1B, the positions and the polarities of the two magnets 135 are adjusted in such a manner that a force for pivotally rotating the movable frame 120 about the axes of the support shafts 124 and 125 is generated by application of a current to the coil 126. Accordingly, in response to application of a current to the coil 126, the movable frame 120 is pivotally rotated about the axes of the support shafts 124 and 125 by the electromagnetic driving force generated in the coil 126, and the transparent member 200 is pivotally rotated in accordance with the pivotal rotation of the movable frame 120.

Figure 2:
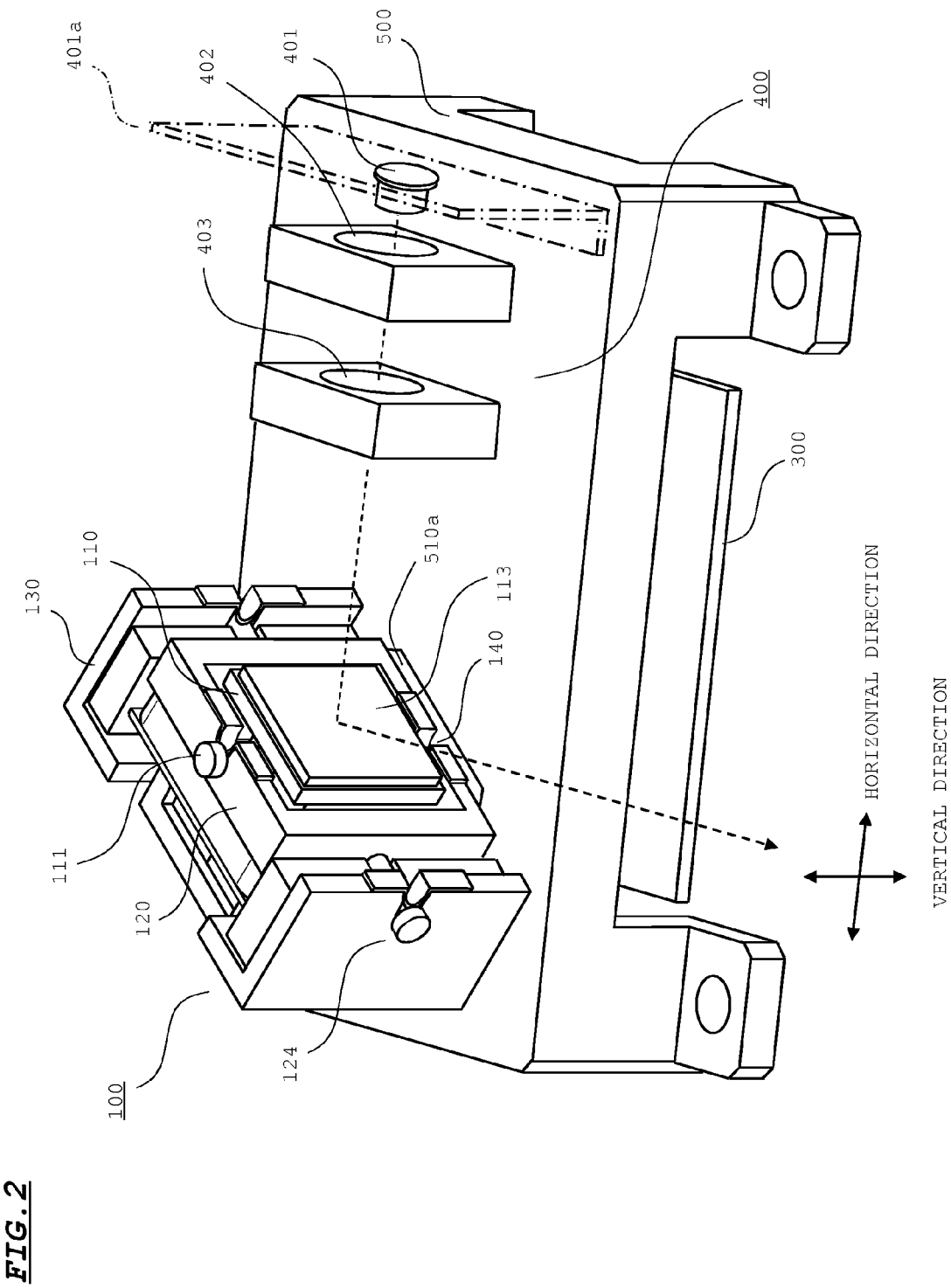
FIG. 2 is a diagram showing an optical system in a beam irradiation device embodying the invention.

FIG. 2 is a diagram showing an arrangement of an optical system in a state that the mirror actuator 100 is mounted.

Referring to FIG. 2, the reference numeral 500 indicates a base plate for supporting an optical system. The base plate 500 is formed with an opening 510a at a position where the mirror actuator 100 is installed. The mirror actuator 100 is mounted on the base plate 500 in such a manner that the transparent member 200 is received in the opening 510a.

An optical system 400 for guiding laser light to the mirror 113 is mounted on a top surface of the base plate 500. The optical system 400 includes a laser light source 401, and lens 402 and 403 for beam shaping. The laser light source 401 is mounted on a substrate 401a for a laser light source, and the substrate 401a is provided on the top surface of the base plate 500.

Laser light emitted from the laser light source 401 is subjected to convergence in a horizontal direction and a vertical direction by the lenses 402 and 403, respectively. The lenses 402 and 403 are designed in such a manner that the beam shape in a targeted area (e.g. an area defined at a position 100 m away in a forward direction from a beam exit port of a beam irradiation device) has predetermined dimensions (e.g. dimensions of about 2 m in the vertical direction and 1 m in the horizontal direction).

The lens 402 is a cylindrical lens having a lens function in the vertical direction, and the lens 403 is an aspherical lens for emitting scanning laser light as substantially parallel light. A beam emitted from a laser light source has different divergence angles from each other in the vertical direction and the horizontal direction. The first lens 402 changes a ratio between divergence angles of laser light in the vertical direction and the horizontal direction. The second lens 403 changes magnifications of divergence angles (both in the vertical direction and the horizontal direction) of an emitted beam.

Scanning laser light transmitted through the lenses 402 and 403 is entered into the mirror 113 of the mirror actuator 100, and reflected on the mirror 113 toward a targeted area. The targeted area is scanned in the two-dimensional direction with the scanning laser light when the mirror 113 is two-dimensionally driven by the mirror actuator 100.

The mirror actuator 100 is disposed at such a position that scanning laser light from the lens 403 is entered into the mirror surface of the mirror 113 at an incident angle of 45 degrees with respect to the horizontal direction, when the mirror 113 is set to a neutral position. The term "neutral position" indicates a position of the mirror 113, wherein the mirror surface is aligned in parallel to the vertical direction, and scanning laser light is entered into the mirror surface at an incident angle of 45 degrees with respect to the horizontal direction.

A circuit board 300 is provided underneath the base plate 500. Further, circuit boards 301 and 302 are provided on aback surface and a side surface of the base plate 500.

FIG. 3A is a partial plan view of the base plate 500, viewed from the back side of the base plate 500. FIG. 3A shows a part of the back surface of the base plate 500, i.e. a vicinity of the position where the mirror actuator 100 is mounted.

As shown in FIG. 3A, walls 501 and 502 are formed on the periphery of the back surface of the base plate 500. A flat surface 510 lower than the walls 501 and 502 is formed in a middle portion of the back surface of the base plate 500 with respect to the walls 501 and 502. The wall 501 is formed with an opening for receiving a semiconductor laser 310. The circuit board 301 loaded with the semiconductor laser 310 is attached to an outer side surface of the wall 501 in such a manner that the semiconductor laser 310 is received in the opening of the wall 501. Further, the circuit board 302 loaded with a PSD 315 is attached to a position near the wall 502.

A light collecting lens 311, an aperture 312, and a ND (neutral density) filter 313 are mounted on the flat surface 510 on the back surface of the base plate 500 by an attachment member 314. The flat surface 510 is formed with an opening 510a, and the transparent member 200 mounted on the mirror actuator 100 is projected from the back surface of the base plate 500 through the opening 510a. In this example, when the mirror 113 of the mirror actuator 100 is set to the neutral position, the transparent member 200 is set to such a position that the two flat surfaces of the transparent member 200 are aligned in parallel to the vertical direction, and are inclined with respect to an optical axis of emission light from the semiconductor laser 310 by 45 degrees.

Laser light (hereinafter, called as "servo light") emitted from the semiconductor laser 310 transmitted through the light collecting lens 311 has the beam diameter thereof reduced by the aperture 312, and has the light intensity thereof reduced by the ND filter 313. Thereafter, the servo light is entered into the transparent member 200, and subjected to refraction by the transparent member 200. Thereafter, the servo light transmitted through the transparent member 200 is received by the PSD 315, which, in turn, outputs a position detection signal depending on a light receiving position of servo light.

FIG. 3B is a diagram schematically showing how a pivotal position of the transparent member 200 is detected by the PSD 315.

An emission position of servo light on the X-Y plane differs before and after incidence of the servo light into the transparent member 200 due to a refractive function of the transparent member 200 disposed with a certain inclination with respect to the optical axis of laser light. If the transparent member 200 is pivotally moved in the direction of the arrow in FIG. 3B, an optical path of servo light is changed as shown by the continuous line form the dotted line in FIG. 3B, and the light receiving position of servo light on the PSD 315 is changed. Accordingly, the pivotal position of the transparent member 200 can be detected, based on a light receiving position of servo light to be detected by the PSD 315.

Figure 4A:
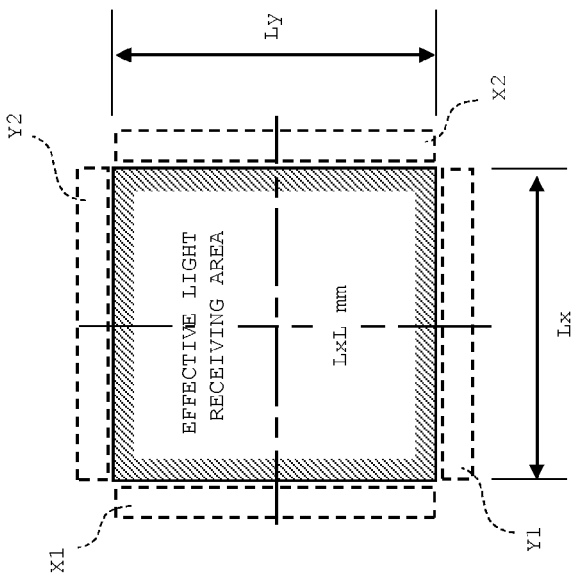
FIGS. 4A and 4B are diagrams showing an arrangement of a PSD in the embodiment.
Figure 4B:
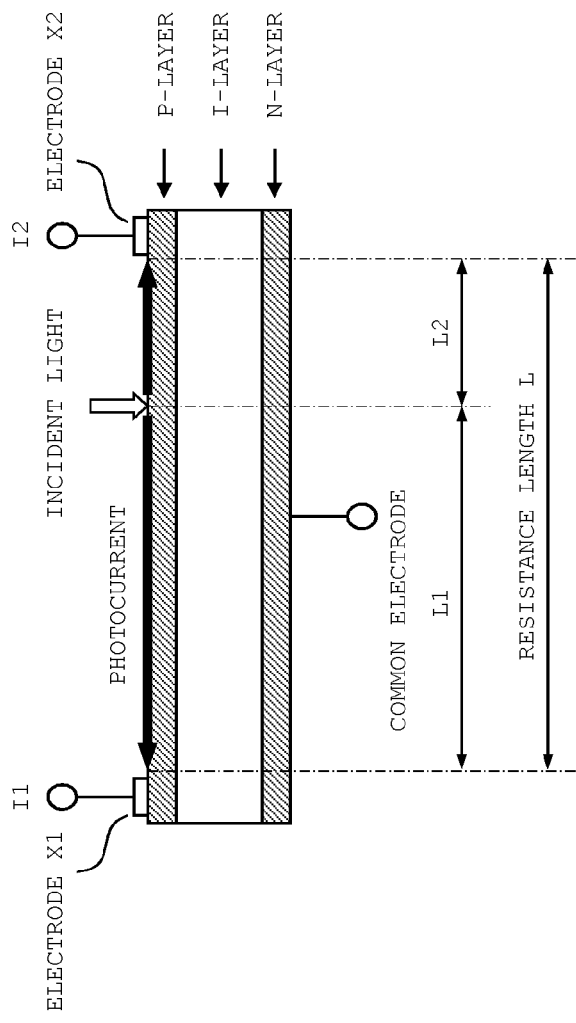

FIG. 4A is a diagram (a side sectional view) showing an arrangement of the PSD 315, and FIG. 4B is a diagram showing a light receiving surface of the PSD 315.

Referring to FIG. 4A, the PSD 315 has such a structure that a P-type resistive layer serving as a light receiving surface and a resistive layer is formed on a surface of an N-type high resistive silicon substrate. Electrodes X1 and X2 for outputting a photocurrent in the horizontal direction on the plane of FIG. 4B, and electrodes Y1 and Y2 (not shown in FIG. 4A) for outputting a photocurrent in the vertical direction on the plane of FIG. 4B are formed on a surface of the resistive layer. A common electrode is formed on the back surface of the substrate.

When laser light is irradiated onto the light receiving surface of the substrate, an electric charge proportional to a light amount is generated at an irradiated position of the light receiving surface. The electric charge is received by the resistive layer as a photocurrent, and the photocurrent is divided in inverse proportion to a distance to the respective corresponding electrodes, and outputted from the electrodes X1, X2, Y1, and Y2. In this example, currents to be outputted from the electrodes X1, X2, Y1, and Y2 each has a magnitude obtained by dividing a photocurrent in inverse proportion to a distance from the laser light irradiated position to the respective corresponding electrodes. Thus, the light irradiated position on the light receiving surface can be detected, based on current values to be outputted from the electrodes X1, X2, Y1, and Y2.

Figure 5A:
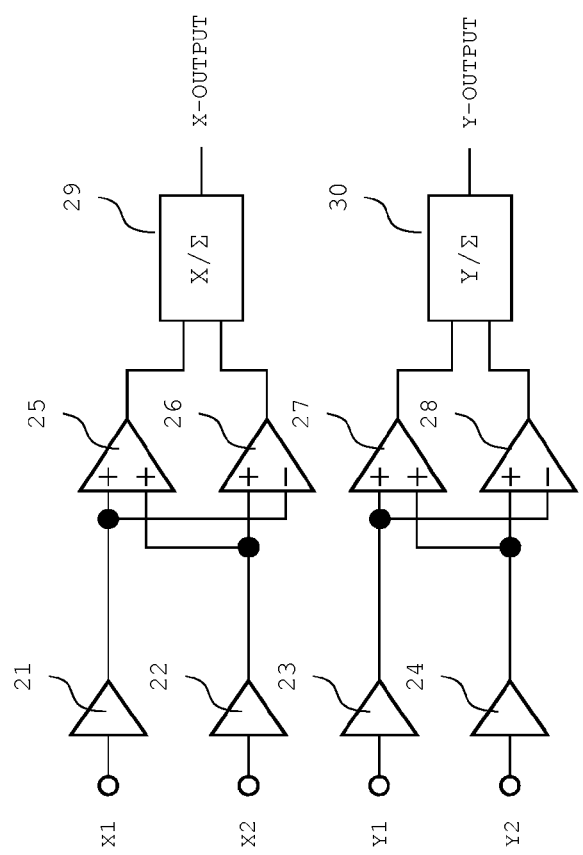
FIGS. 5A and 5B are diagrams for describing a method for generating a position detection signal in the embodiment.

For instance, let it be assumed that servo light is irradiated to a position P in FIG. 5A. In this case, a coordinate (x, y) of the position P, with a center position of the light receiving surface being defined as a reference point, is calculated by e.g. the following equations (1) and (2):

$$\frac{Ix2 - Ix1}{Ix2 + Ix1} = \frac{2x}{Lx} \quad (1)$$

$$\frac{Iy2 - Iy1}{Iy2 + Iy1} = \frac{2y}{Ly} \quad (2)$$

where Ix1, Ix2, Iy1, and Iy2 are amounts of current to be outputted from the electrodes X1, X2, Y1, and Y2, respectively, and Lx and Ly are distances between the electrodes in X direction and Y direction, respectively.

Figure 5B:
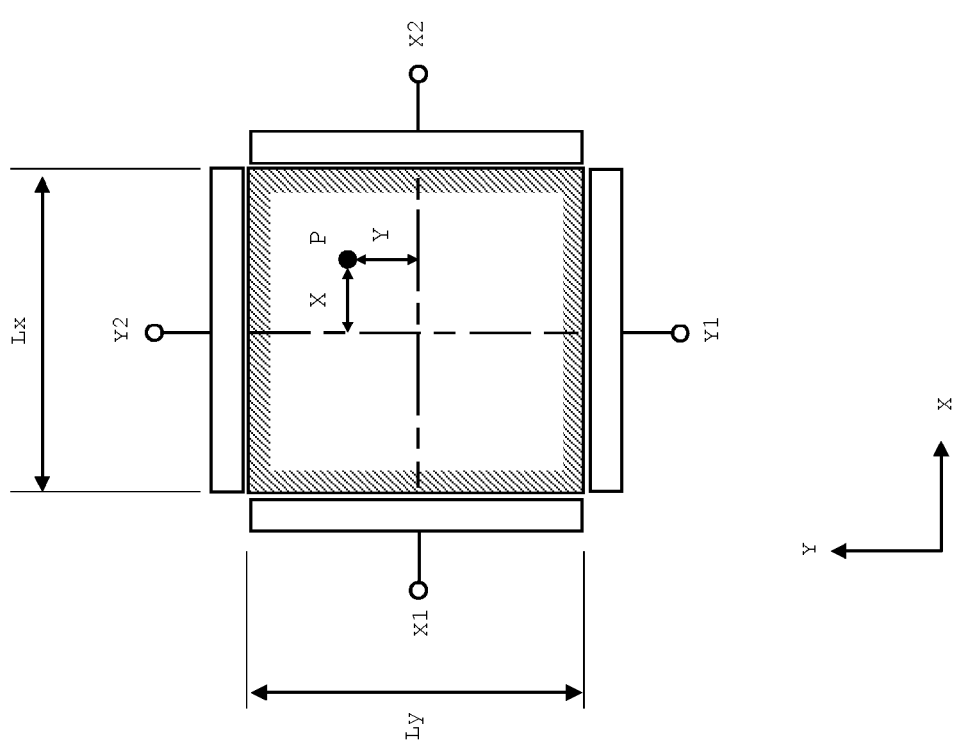

FIG. 5B is a diagram showing an arrangement of a computation circuit for realizing the above equations (1) and (2). The current signals Ix1, Ix2, Iy1, and Iy2 to be outputted from the electrodes X1, X2, Y1, and Y2 are amplified by amplifiers 21, 22, 23, and 24, respectively. Then, computations (Ix2+Ix1) and (Iy2+Iy1) are performed by adder circuits 25 and 27, respectively. Then, computations (Ix2−Ix1) and (Iy2−Iy1) are performed by subtraction circuits 26 and 28, respectively. Then, divisions as expressed by the left-hand members of the equations (1) and (2) are performed by divider circuits 29 and 30, respectively. Thus, position detection signals indicating an X-directional position (2x/Lx) and a Y-directional position (2y/Ly) at the light receiving position P of servo light are outputted from the divider circuits 29 and 30, respectively.

FIG. 5B shows a circuit configuration for performing computations with respect to the current signals Ix1, Ix2, Iy1, and Iy2. Alternatively, a position detection signal may be generated by performing computations based on voltage signals obtained by I/V conversion of the current signals Ix1, Ix2, Iy1, and Iy2 in the similar manner as described above.

Figure 6:
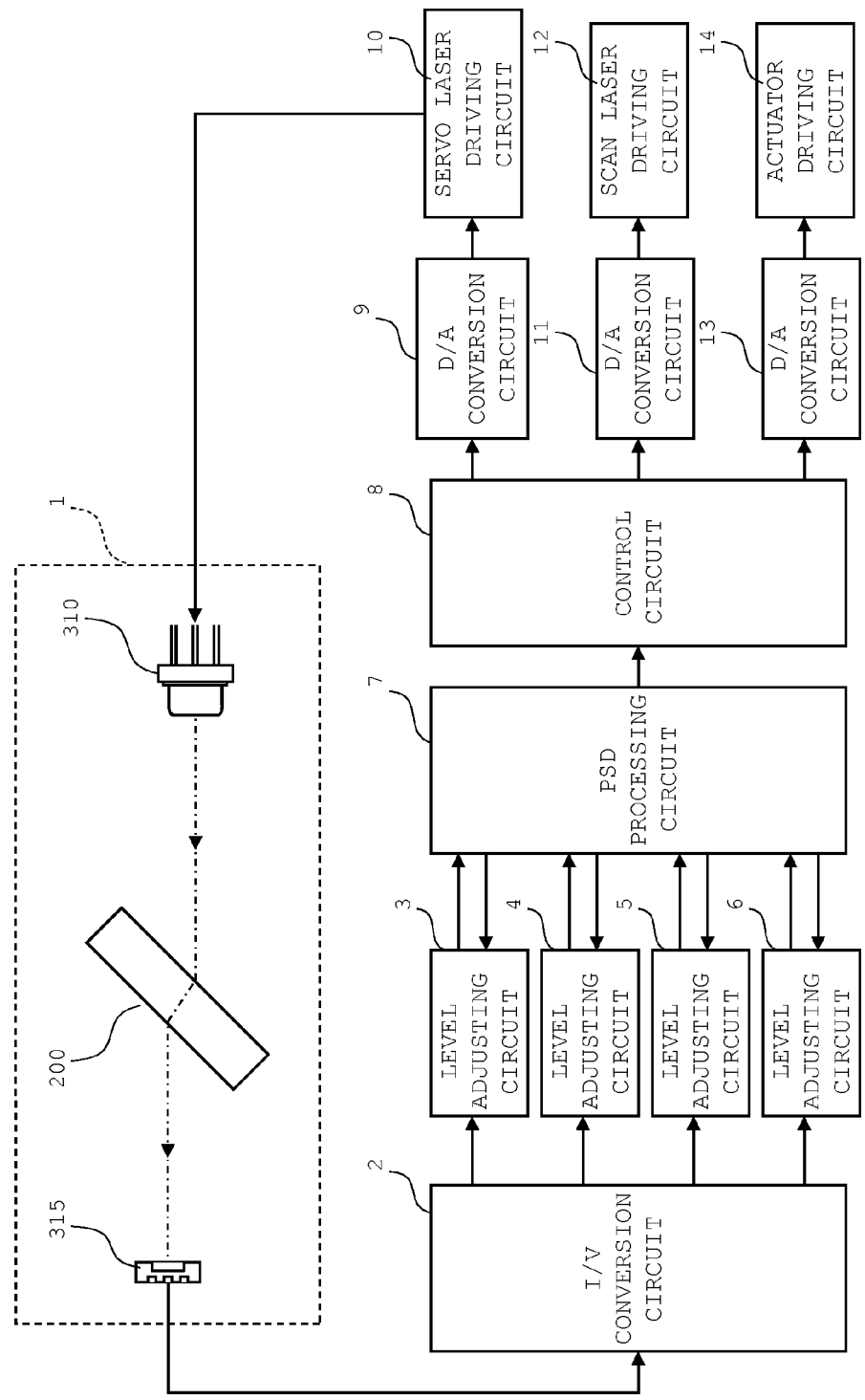
FIG. 6 is a diagram showing a circuit configuration of the beam irradiation device in the embodiment.

FIG. 6 is a diagram showing a circuit configuration of the beam irradiation device in the embodiment. To simplify the description, the primary elements of the servo optical system 1 shown in FIG. 3A are shown in FIG. 6.

As shown in FIG. 6, the beam irradiation device includes an I/V conversion circuit 2, level adjusting circuits 3 through 6, a PSD signal processing circuit 7, a control circuit 8, D/A conversion circuits 9, 11, and 13, a servo laser driving circuit 10, a scan laser driving circuit 12, and an actuator driving circuit 14.

In the servo optical system 1, as described above, after the servo light emitted from the semiconductor laser 310 is refracted by the transparent member 200, the servo light is entered into the light receiving surface of the PSD 315. Accordingly, current signals (current signals to be outputted from the electrodes X1, X2, Y1, and Y2 shown in FIG. 5A) depending on a light receiving position of servo light are outputted from the PSD 315, and inputted to the I/V conversion circuit 2.

The I/V conversion circuit 2 converts the current signals to be inputted from the electrodes X1, X2, Y1, and Y2 into voltage signals, and outputs the voltage signals to the level adjusting circuits 3, 4, 5, and 6. The level adjusting circuits 3 through 6 output, to the PSD processing circuit 7, digital signals, each of which is obtained by subjecting one of the inputted voltage signal and a differential signal thereof to A/D conversion. The arrangements of the level adjusting circuits 3 through 6 will be described later in detail.

The PSD processing circuit 7 generates a signal indicating a light receiving position of servo light, based on the computation described referring to FIG. 5B, using the voltage signals (digital signals) inputted from the level adjusting circuits 3 through 6. Further, the PSD processing circuit 7 outputs a clock signal for issuing a sampling timing to the level adjusting circuits 3 through 6, and performs a switching operation with respect to the level adjusting circuits 3 through 6. The arrangement and the control operation of the PSD processing circuit 7 will be described later in detail.

The control circuit 8 detects a scanning position of laser light in a targeted area, based on a position detection signal indicating a light receiving position of inputted servo light, and executes e.g. a drive control of the mirror actuator 100, and a drive control of the laser light source 401.

Specifically, the control circuit 8 outputs, to the scan laser driving circuit 12 through the D/A conversion circuit 11, a pulse drive signal at a timing when the scanning position of laser light in the targeted area has reached a predetermined position. Thereupon, the laser light source 401 is pulse-emitted to irradiate laser light onto the targeted area. Further, the control circuit 8 outputs, to the actuator driving circuit 14 through the D/A conversion circuit 13, a servo signal which causes the scanning position of servo light in the targeted area to follow a predetermined trajectory. Thereupon, the actuator driving circuit 14 drives the mirror actuator 100 to scan the targeted area in such a manner that laser light follows the predetermined trajectory.

Further, the control circuit 8 outputs a control signal to the servo laser driving circuit 10 through the D/A conversion circuit 9. Accordingly, the semiconductor 310 in the servo optical system 1 constantly emits light with a constant power level.

Figure 7:
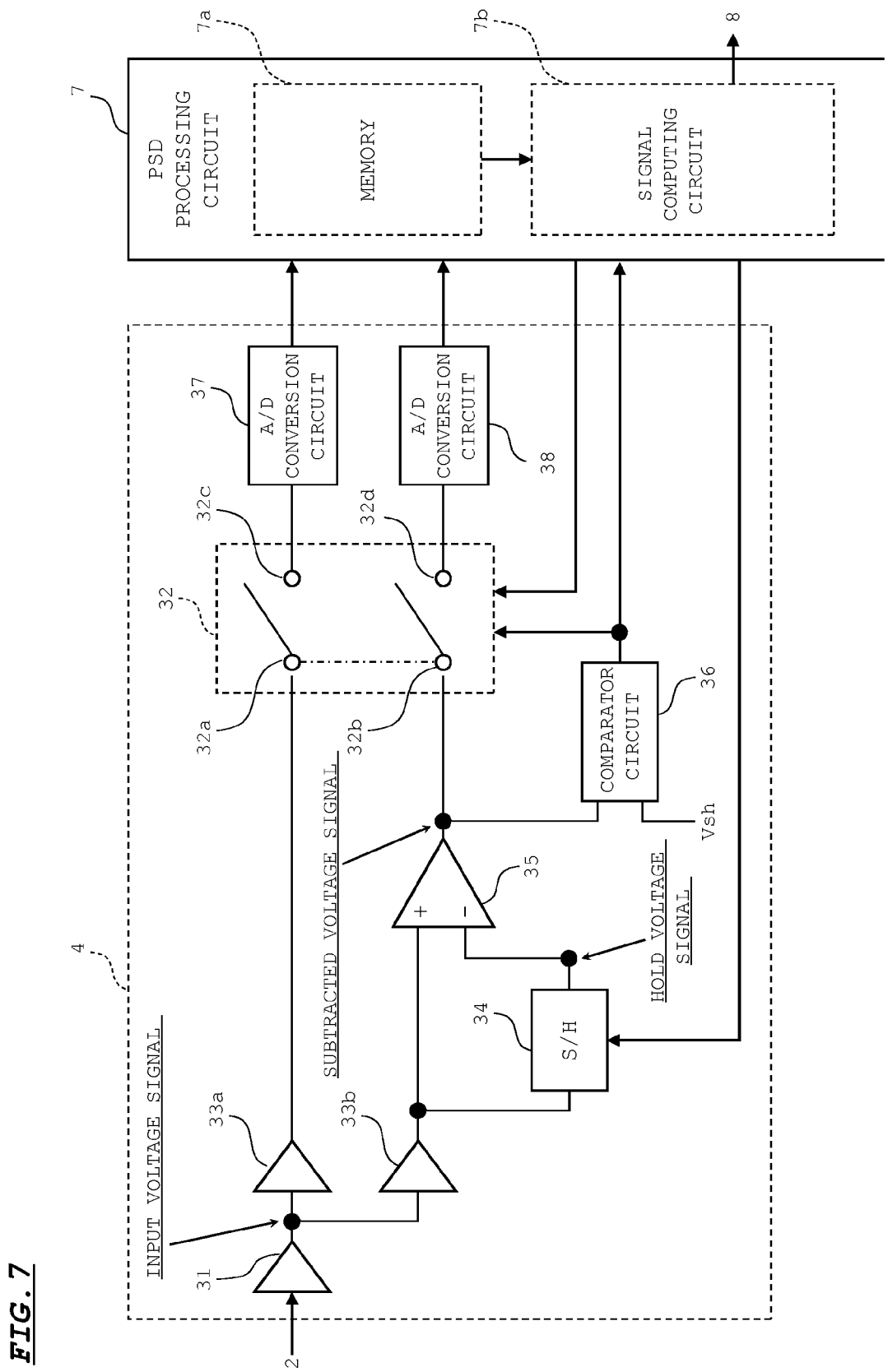
FIG. 7 is a diagram showing a level adjusting circuit and a PSD processing circuit in the embodiment.

Next, the circuit configurations of the level adjusting circuits 3 through 6 are described referring to FIG. 7. To simplify the description, in FIG. 7, the arrangement of the level adjusting circuit 4 for processing a signal from the electrode X2 shown in FIG. 5A is illustrated. The arrangements of the level adjusting circuits 3, 5, and 6 are the same as the arrangement of the level adjusting circuit 4. Signals from the level adjusting circuits 3, 5, and 6 are processed by the PSD processing circuit 7 in the same manner as described above, stored into the memory 7a, and subjected to a signal processing. Further, a switching circuit 32 in each of the level adjusting circuits 3, 5, and 6 is switched over in the same manner as a switching circuit 32 in the level adjusting circuit 4 shown in FIG. 6. Hereinafter, description on the level adjusting circuit 4 is made, and description on the level adjusting circuits 3, 5, and 6 is omitted herein.

As shown in FIG. 7, the level adjusting circuit 4 includes an amplifier 31, the switching circuit 32, buffer amplifiers 33a and 33b, an S/H (sample-and-hold) circuit 34, a subtractor 35, a comparator circuit 36, and A/D conversion circuits 37 and 38.

The amplifier 31 amplifies a voltage signal, for the electrode X2, to be inputted from the I/V conversion circuit 2, and outputs the amplified voltage signal to the buffer amplifiers 33a and 33b. Hereinafter, a voltage signal to be outputted from the amplifier 31 is called as an "input voltage signal".

The buffer amplifier 33a outputs a voltage signal to be inputted from the amplifier 31 to a terminal 32a, and the buffer amplifier 33b outputs a voltage signal to be inputted from the amplifier 31 to the S/H circuit 34 and the subtractor 35. The buffer amplifiers 33a and 33b are adapted to absorb an influence of load fluctuation resulting from a switching operation of the switching circuit 32. The voltages outputted from the buffer amplifiers 33a and 33b are equal to each other.

The switching circuit 32 switches over between a state wherein the terminal 32a and a terminal 32c are connected to each other and terminals 32b and 32d are not connected to each other (hereinafter, called as "a crest value connection state"), and a state wherein the terminals 32a and 32c are not connected to each other and the terminals 32b and 32d are connected to each other (hereinafter, called as "a differential connection state"), based on a signal from the comparator circuit 36 or the PSD processing circuit 7.

The S/H circuit 34 holds a voltage signal to be inputted from the buffer amplifier 33b at each sampling timing by a clock signal to be inputted from the PSD processing circuit 7. Specifically, the S/H circuit 34 keeps on holding a voltage signal held at a certain sampling timing to a succeeding sampling timing, and holds another voltage signal to be inputted from the buffer amplifier 33b at the succeeding sampling timing. Hereinafter, a voltage signal to be held by the S/H circuit 34 is called as a "hold voltage signal".

The subtractor 35 outputs, to the terminal 32b and the comparator circuit 36, a difference obtained by subtracting a voltage signal to be inputted from the S/H circuit 34 from a voltage signal to be inputted from the buffer amplifier 33b. Hereinafter, a voltage signal to be outputted from the subtractor 35 is called as a "subtracted voltage signal".

The comparator circuit 36 compares a subtracted voltage signal with a threshold value Vsh, and outputs a detection signal to the switching circuit 32 and the PSD processing circuit 7, in the case where the absolute value of the subtracted voltage signal to be inputted from the subtractor 35 is larger than the threshold value Vsh. The switching circuit 32 is set to the crest value connection state by the detection signal. Specifically, the PSD signal processing circuit 7 switches a connection state of the switching circuit 32 in the level adjusting circuit 3 corresponding to the electrode X1 constituting a pair with the electrode X2, to the crest value connection state, based on the detection signal. Similarly, in the case where a detection signal from the level adjusting circuit 4 is detected, the PSD signal processing circuit 7 switches a connection state of the switching circuit 32 in the level adjusting circuit 4 to the crest value connection state. Further, similarly, the PSD signal processing circuit 7 switches connection states of the switching circuits 32 in the level adjusting circuits 5 and 6 corresponding to the electrodes Y1 and Y2 to the crest value connection state.

The threshold value Vsh is set to a maximum value Vmax in an allowable conversion range of an analog input signal to be inputted to the A/D conversion circuit 38, or a value slightly smaller than the maximum value Vmax. The threshold value Vsh and the maximum value Vmax will be described later in detail referring to FIGS. 11A and 11B.

The A/D conversion circuits 37 and 38 respectively convert voltage signals to be inputted from the terminals 32c and 32d into digital signals in synchronism with a sampling timing of the S/H circuit 34, and output the digital signals to the PSD processing circuit 7.

The memory 7a stores an input voltage signal (a voltage signal corresponding to a signal from the electrode X2 shown in FIG. 5A) which has been generated by a procedure to be described later, based on the respective voltage signals to be inputted from the A/D conversion circuits 37 and 38. Further, the memory 7a stores input voltage signals (voltage signals corresponding to signals from the electrodes X1, Y1, and Y2 shown in FIG. 5A) which have been generated based on the respective voltage signals to be inputted from the level adjusting circuits 3, 5 and 6.

The signal computing circuit 7b generates a position detection signal indicating a light receiving position of servo light, based on the computations expressed by the above equations (1) and (2), using the input voltage signals to be outputted from the respective memories corresponding to the level adjusting circuits 3 through 6; and outputs the generated position detection signal to the control circuit 8.

Next, operations to be performed by the level adjusting circuit 4 and the PSD processing circuit 7 are described.

In the case where the connection state of the switching circuit 32 is a crest value connection state, an input voltage signal to be outputted from the amplifier 31 is inputted to the A/D conversion circuit 37 through the terminals 32a and 32c, and converted into a digital signal. The input voltage signal as a digital signal is sequentially outputted to the PSD processing circuit 7.

On the other hand, in the case where the connection state of the switching circuit 32 is a differential connection state, a subtracted voltage signal from the subtractor 35 is inputted to the A/D conversion circuit 38 through the terminals 32b and 32d of the switching circuit 32, and converted into a digital signal. The subtracted voltage signal as a digital signal is sequentially outputted to the PSD processing circuit 7.

Figure 8:
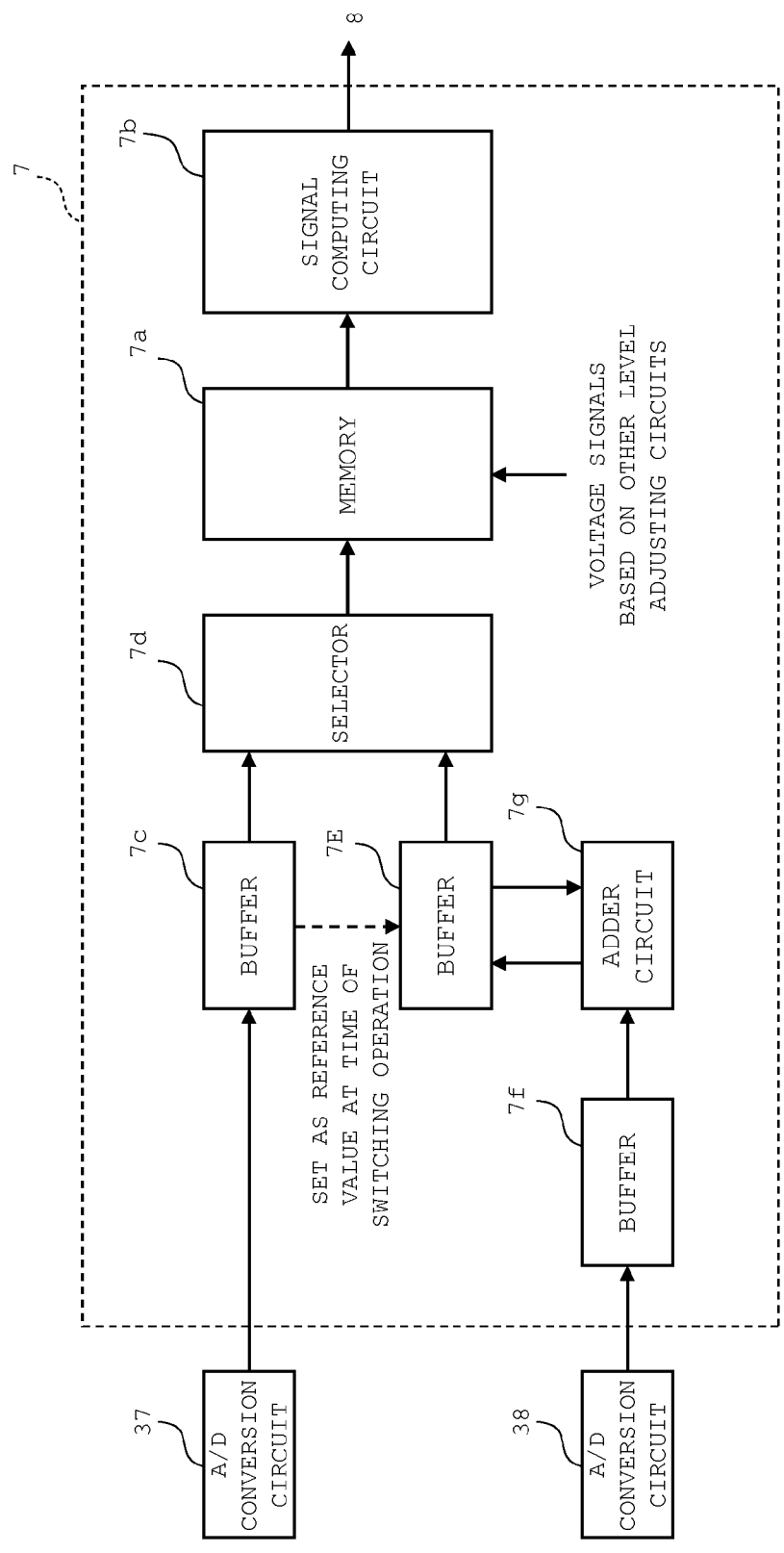
FIG. 8 is a diagram showing essential circuit elements in the PSD processing circuit in the embodiment.

FIG. 8 is a diagram showing essential circuit elements in the PSD processing circuit 7.

In the case where the connection state of the switching circuit 32 is a crest value connection state, an input voltage signal inputted from the A/D conversion circuit 37 is temporarily stored in the buffer 7c, and then stored into the memory 7a from the buffer 7c through the selector 7d. In this way, the input voltage signal from the A/D conversion circuit 37 is stored into the memory 7a at each of the sampling timings. Simultaneously with the above operation, input voltage signals from the level adjusting circuits 3, 5, and 6 are stored into the memory 7a.

In the case where the switching circuit 32 is switched over from a crest value connection state to a differential connection state, the input voltage signal which has been stored in the buffer 7c immediately before the switching operation is stored in the buffer 7e. Thereafter, in response to input of a subtracted voltage signal from the A/D conversion circuit 38 at a succeeding sampling timing, the subtracted voltage signal is temporarily stored in the buffer 7f, and then, added to the input voltage signal stored in the buffer 7e by the adder circuit 7g. A voltage signal generated by the summation is a summation signal obtained by adding a subtracted voltage signal to an input voltage signal at a preceding sampling timing. Accordingly, the voltage signal represents a crest value of the input voltage signal at a current sampling timing.

The aforementioned voltage signal (a crest value signal) is overwritten in the buffer 7e, and stored into the memory 7a from the buffer 7e through the selector 7d, as an input voltage signal at the current sampling timing, before the succeeding sampling timing. Then, at the succeeding sampling timing, a subtracted voltage signal at the succeeding sampling timing is added to the voltage signal (a crest value signal) stored in the buffer 7e, and another voltage signal (a crest value signal) is overwritten in the buffer 7e. The overwritten voltage signal (a crest value signal) is stored into the memory 7a through the selector 7d, as an input voltage signal at the succeeding sampling timing.

In this way, at each of the sampling timings, a voltage signal (a crest value signal) obtained by sequentially and accumulatively adding a subtracted voltage signal from the A/D conversion circuit 38 to an input voltage signal immediately before the switching circuit 32 is switched over to a differential connection state, is stored into the memory 7a, as an input voltage signal at each of the sampling timings. Simultaneously with the above operation, voltage signals (crest value signals) from the level adjusting circuits 3, 5, and 6 are stored into the memory 7a, as input voltage signals.

The signal computing circuit 7b successively reads out the input voltage signals which have been stored in the above-described manner and derived from a signal from the A/D conversion circuit 37 or 38, and performs computations based on the equations (1) and (2). Thus, a position detection signal at a corresponding sampling timing is generated, and the generated position detection signal is outputted to the control circuit 8.

Next, an operation to be performed by the beam irradiation device in the embodiment is described.

Figure 9A:
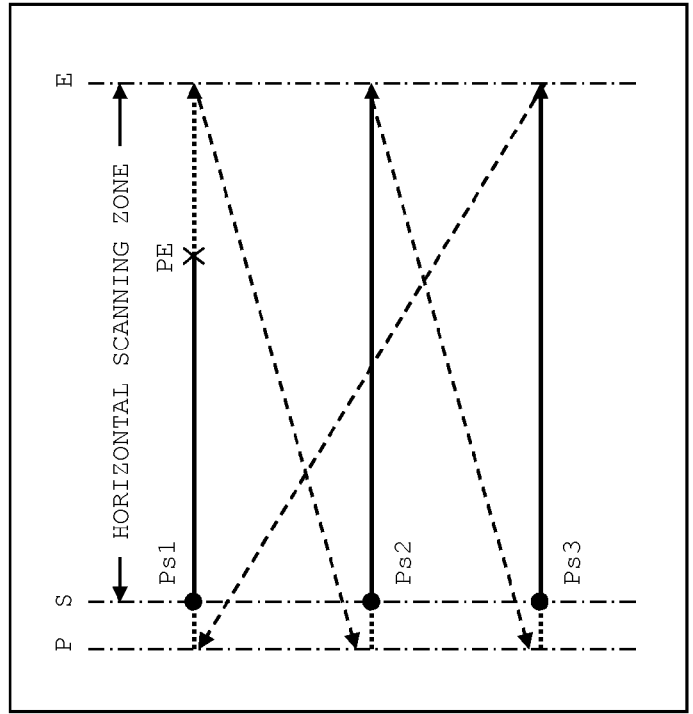
FIGS. 9A and 9B are diagrams schematically showing a scanning trajectory of servo light in the embodiment.

FIG. 9A is a diagram schematically showing a scanning trajectory of servo light on the light receiving surface of the PSD 315, in scanning a targeted area with scanning laser light. The embodiment is described based on the premise that scanning laser light scans a targeted area by three rows in a horizontal direction.

L1, L2, and L3 shown in FIG. 9A are scanning trajectories of servo light on the light receiving surface of the PSD 315, in the case where scanning laser light scans an uppermost scanning line, an intermediate scanning line, and a lowermost scanning line in a targeted area. In FIG. 9A, a zone from a position S to a position E is a horizontal scanning zone corresponding to a search zone in the targeted area. In the scanning trajectory of each of the scanning lines, servo light starts a scanning operation from a position P further forward of a start position Ps1, Ps2, Ps3 in the horizontal scanning zone, and is then moved to the start position Ps1, Ps2, Ps3 before reaching the position S. Then, after the scanning position of servo light has reached the start position Ps1, Ps2, Ps3, the servo light scans in the horizontal direction up to the end position E, and thereafter, is returned to the position P on a succeeding scanning line.

In this embodiment, the switching circuit 32 shown in FIG. 7 is kept in a crest value connection state during a time zone when the servo light is returned from the position E to the position P, and a time zone when the servo light is moved from the position P to the position S; and the switching circuit 32 is kept in a differential connection state during a time zone corresponding to the horizontal scanning zone when the servo light is moved from the position P to the position E. The aforementioned switching control of the switching circuit 32 is performed based on a control signal to be supplied from the PSD processing circuit 7 to the switching circuit 32.

In the case where the switching circuit 32 is switched over from a crest value connection state to a differential connection state, an input voltage signal which has been stored in the buffer 7c shown in FIG. 8 at a sampling timing immediately before the switching operation is performed, is stored in the buffer 7e. Then, after the switching circuit 32 is switched over to a differential connection state, a subtracted voltage signal (a signal inputted from the A/D conversion circuit 38) obtained at each of the sampling timings is accumulatively added to the input voltage signal, whereby a voltage signal (a crest value signal) at each of the sampling timings is obtained. As described above, the thus obtained voltage signal (a crest value signal) is stored into the memory 7a, as an input voltage signal, and a position detection signal is generated by the signal computing circuit 7b based on the input voltage signal.

Figure 9B:
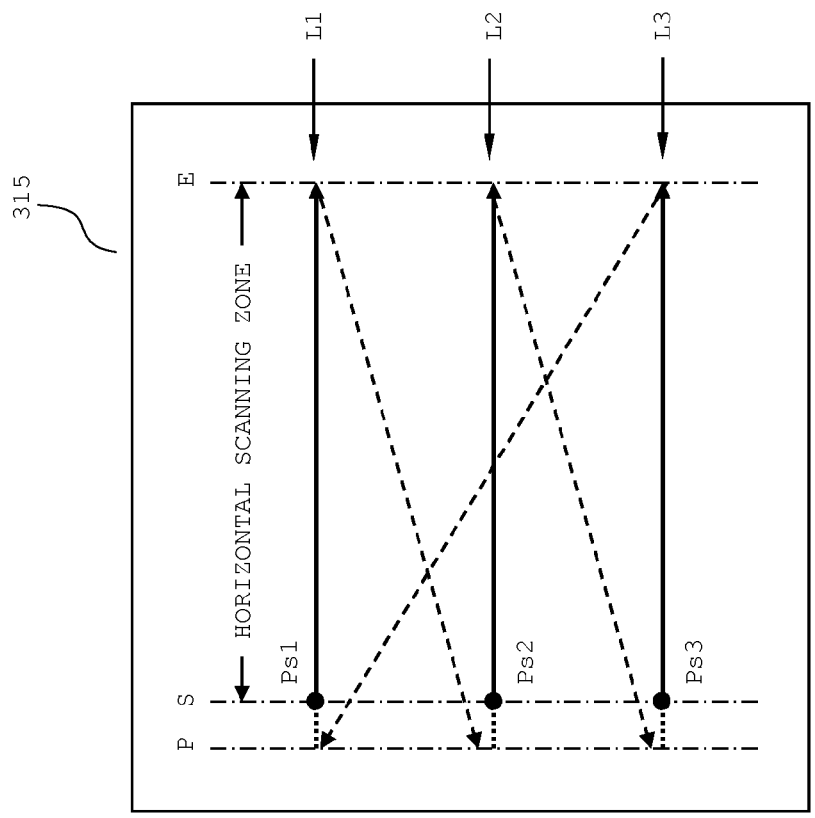

Further, after the switching circuit 32 is set to a differential connection state, in response to output of a detection signal from the comparator circuit 36 before the horizontal scanning zone shown in FIG. 9A is ended, the switching circuit 32 is switched over to a crest value connection state again, and the crest value connection state is continued until a scanning position of servo signal reaches one of the start positions Ps1 through Ps3 next time. For instance, as shown in FIG. 9B, in response to output of a detection signal from the comparator circuit 36 at a certain position Pe on the scanning trajectory L1, the switching circuit 32 is set to a crest value connection state until a scanning position of servo light reaches the start position Ps2 on the succeeding scanning trajectory L2. In this case, an input voltage signal stored in the buffer 7c shown in FIG. 8 is stored into the memory 7a during a time from the timing when the servo light has reached the position Pe to the timing when the servo light has reached the start position Ps2, and the input voltage signal is used to generate a position detection signal.

Figures 10A, 10B, 10C:
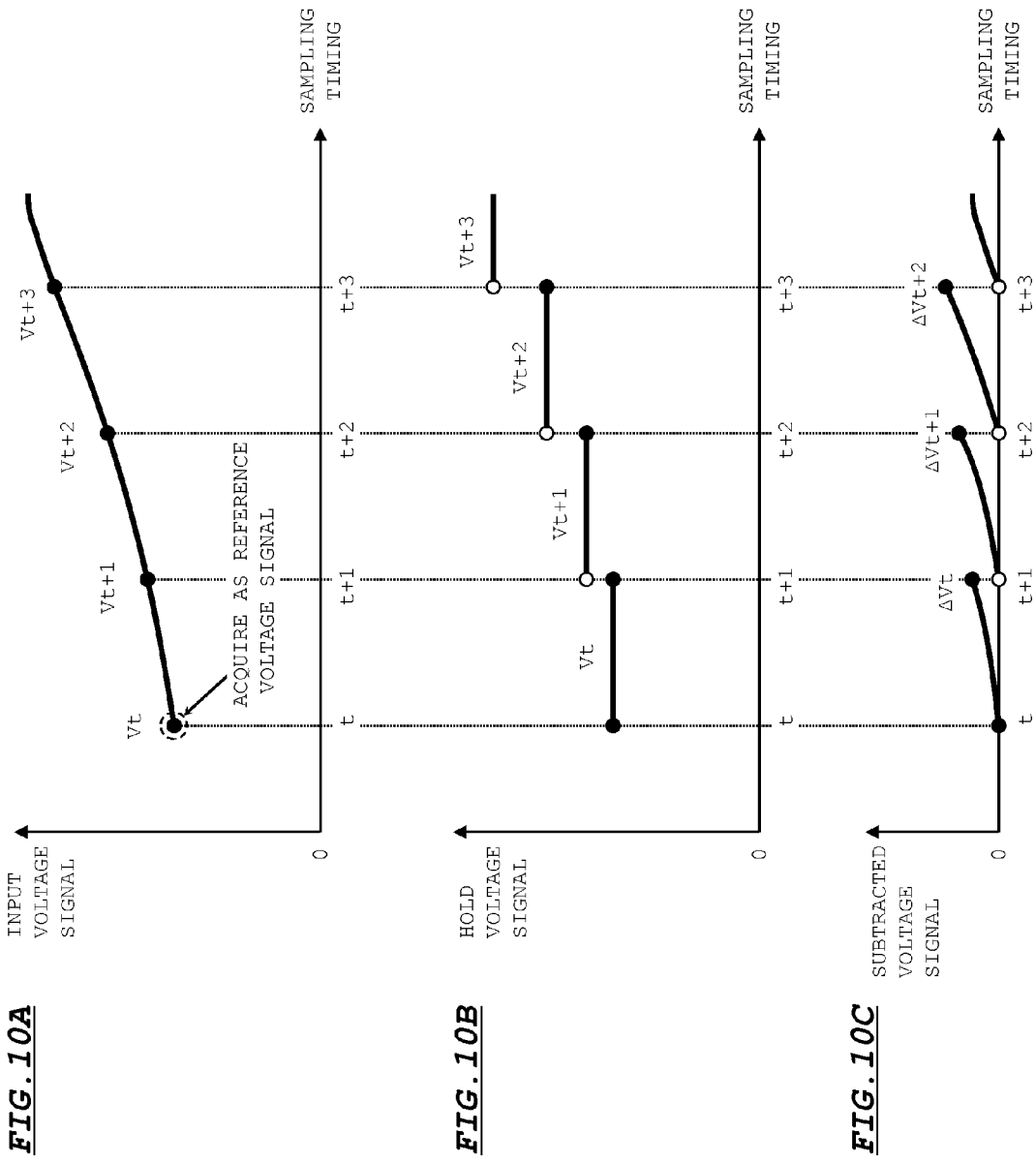
FIGS. 10A, 10B, and 10C are diagrams showing changes in respective voltage signals in the embodiment.

FIGS. 10A through 10C are diagrams showing changes in the respective voltage signals in the level adjusting circuit 4, in a case that the value of a subtracted voltage signal is smaller than the threshold value Vsh, i.e. a case that a detection signal is not outputted from the comparator circuit 36. Since it is conceived that the change is substantially the same as the change in the level adjusting circuits 3, 5, and 6, the change is described only with respect to the level adjusting circuit 4 in this section.

FIGS. 10A, 10B, and 10C are diagrams respectively showing an input voltage signal, a hold voltage signal, and a subtracted voltage signal. In FIGS. 10A through 10C, the axes of abscissas indicate sampling timings to be generated from the PSD processing circuit 7, and the axes of ordinates indicate the respective voltage signals. In FIGS. 10A through 10C, the input voltage signal and the subtracted voltage signal are analog signals before A/D conversion.

Referring to FIG. 10A, let it be assumed that a voltage signal Vt is stored in the buffer 7c shown in FIG. 8 by a crest value connection at a sampling timing (t). In this state, the voltage signal Vt is held by the S/H circuit 34. Thereafter, the switching circuit 32 is switched over to a differential connection state.

Let it be assumed that the input voltage signal is changed along a curve from Vt to (Vt+1) during a time from a sampling timing (t) to a sampling timing (t+1). During the time, the hold voltage signal held in the S/H circuit 34 remains as the hold voltage signal Vt that has been held at a sampling timing immediately before the current sampling timing. Further, the subtracted voltage signal is set to zero at the sampling timing (t) shown in FIG. 10C, is increased along a curve in the similar manner as the input voltage signal until the sampling timing (t+1), and becomes ΔVt at the sampling timing (t+1).

Then, at the sampling timing (t+1), the voltage signal to be outputted from the signal computing circuit 7b is set to a value, which is equal to a summation of the voltage signal Vt and the subtracted voltage signal. Specifically, a voltage signal (Vt+1') to be outputted to the signal computing circuit 7 is expressed by:

$$Vt+1' = Vt + \Delta Vt$$

where Vt is a voltage signal, and ΔVt is a subtracted voltage signal.

Then, at a succeeding sampling timing (t+2), a voltage signal (Vt+2') to be outputted to the signal computing circuit 7b is expressed by:

$$Vt + 2' = Vt + 1' + (\Delta Vt + 1)$$
$$= Vt + \{\Delta Vt + (\Delta Vt + 1)\}$$

Similarly, at a succeeding sampling timing (t+3), a voltage signal (Vt+3') to be outputted to the signal computing circuit 7b is expressed by:

$$Vt + 3' = Vt + 2' + (\Delta Vt + 2)$$
$$= Vt + \{\Delta Vt + (\Delta Vt + 1) + (\Delta Vt + 2)\}$$

As described above, after the switching circuit 32 is switched over to a differential connection state, a subtracted voltage signal at each of the sampling timings is accumulatively added to the initial input voltage signal Vt, a voltage signal (a crest value signal) at each of the sampling timings is generated, and the generated voltage signals (a crest value signals) are successively outputted to the signal computing circuit 7b.

In the case where a voltage signal is obtained by accumulatively adding a subtracted voltage signal in the above-described manner, generally, the absolute value of a subtracted voltage signal to be subjected to A/D conversion at each of the sampling timings is considerably small, as compared with a crest value of an input voltage signal. In view of the above, as compared with the A/D conversion circuit 37, the A/D conversion circuit 38 shown in FIG. 7 may set a considerably small value as the maximum value Vmax in an allowable conversion range with respect to an input analog signal. In this case, if the bit numbers after conversion by the A/D conversion circuits 37 and 38 are identical to each other, the resolution performance with respect to a subtracted voltage signal is remarkably increased, as compared with an input voltage signal. As a result, a voltage signal to be inputted to the signal computing circuit 7b, which is obtained by accumulatively adding a subtracted voltage signal from the A/D conversion circuit 38, has a higher precision, as compared with a case of using an input voltage signal from the A/D conversion circuit 37.

Thus, as described in the embodiment, generating a position detection signal by setting the switching circuit 32 to a differential connection state during the horizontal scanning zone shown in FIGS. 9A and 9B, and obtaining a voltage signal (a crest value signal) based on a subtracted voltage signal from the A/D conversion circuit 38 enables to enhance position detection precision, as compared with a case of generating a position detection signal based on an input voltage signal from the A/D conversion circuit 37. Accordingly, a scanning position of scanning laser light with respect to a targeted area can be precisely detected.

Next, an operation to be performed is described referring to FIGS. 11A and 11B, in the case where the value of a subtracted voltage signal exceeds the threshold value Vsh during a time when the switching circuit 32 is kept in a differential connection state, with the result that a detection signal is outputted from the comparator circuit 36. FIG. 11A is a diagram showing a case (a comparative example) that the switching circuit 32 is kept in a differential connection state after output of a detection signal, and FIG. 11B is a diagram showing a case (the embodiment) that a connection state of the switching circuit 32 is switched over depending on an output of a detection signal.

First, a case that the switching circuit 32 is kept in a differential connection state is described referring to FIG. 11A.

Referring to the uppermost graph in FIG. 11A, an input voltage signal is sharply increased during a time from the sampling timing (t) to the sampling timing (t+1). In this case, since a hold voltage signal is not changed depending on a voltage signal to be inputted, as shown in the intermediate graph in FIG. 11A, the hold voltage signal is fixed to a value (Vt) during the time from the sampling timing (t) to the sampling timing (t+1).

Further, as the input voltage signal is sharply changed as described above, a subtracted voltage signal is also sharply increased. In this case, as shown in the lowermost graph in FIG. 11A, if a subtracted voltage signal to be inputted to the A/D conversion circuit 38 exceeds the conversion maximum value Vmax of the A/D conversion circuit 38, as shown in FIG. 11A, the magnitude of the subtracted voltage signal (a digital signal) to be outputted from the A/D conversion circuit 38 becomes equal to the maximum value Vmax in the allowable conversion range of the A/D conversion circuit 38. Accordingly, at the sampling timing (t+1), the voltage signal (Vt+1') to be outputted to the signal computing circuit 7b becomes: Vt+1'=Vt+Vmax.

As described above, in the above case, the value of a voltage signal to be outputted to the signal computing circuit 7b becomes smaller than the value of the normal input voltage signal (Vt+1). As a result, an error component is included in a voltage signal at a succeeding sampling time. Specifically, in the above case, a voltage signal (a crest value signal) derived from an input voltage signal, as shown by the dotted line in the uppermost graph in FIG. 11A, may be supplied to the signal computing circuit 7b.

Next, a case of switching over a connection state of the switching circuit 32 depending on a subtracted voltage signal is described referring to FIG. 11B.

In the case where a subtracted voltage signal is sharply increased resulting from a sharp increase in an input voltage signal, and the value of the subtracted voltage signal becomes larger than the threshold value Vsh, a detection signal is outputted from the comparator circuit 36. As a result, the connection state of the switching circuit 32 is switched over from a differential connection state to a crest value connection state. Simultaneously with the above operation, a detection signal is outputted to the PSD processing circuit 7. Accordingly, the PSD processing circuit 7 detects that the switching circuit 32 is switched over from a differential connection state to a crest value connection state, and as described above, sets the selector 7d so that the input voltage signal stored in the buffer 7c is stored into the memory 7a.

Thus, at the succeeding sampling timing (t+1), the input voltage signal (Vt+1) which has been stored in the buffer 7c and derived from the A/D conversion circuit 37 is stored into the memory 7a, and supplied to the signal computing circuit 7b for signal computation. Similarly, at the succeeding sampling timing (t+2) and thereafter, an input voltage signal (Vt+2) and thereafter from the A/D conversion circuit 37 are stored into the memory 7a, and supplied to the signal computing circuit 7b for signal computation.

As described above, switching a connection state of the switching circuit 32 based on a detection signal from the comparator circuit 36 enables to avoid a likelihood, which has been described in the comparative example referring to FIG. 11A, that a voltage signal out of a proper range of the input voltage signal may be outputted to the signal computing circuit 7b at the sampling timing (t+1), and enables to suppress a likelihood that an error component at the sampling timing (t+1) may be included in a voltage signal at the succeeding sampling timing (t+2) and thereafter.

As described above, since a position detection signal is generated based on a subtracted voltage signal in the embodiment, precision of a position detection signal during the horizontal scanning zone shown in FIGS. 9A and 9B can be enhanced. Further, in the case where a subtracted voltage signal exceeds the threshold value Vsh during the horizontal scanning zone, the connection state of the switching circuit 32 is switched over to a crest value connection state to generate a position detection signal, based on an input voltage signal to be outputted from the A/D conversion circuit 37. The above arrangement enables to avoid a likelihood that a position detection signal may be deteriorated resulting from an increase of the value of a subtracted voltage signal over the maximum value in the allowable conversion range of the A/D conversion circuit 38.

In the embodiment, in response to output of a detection signal at the position Pe shown in FIG. 9B, the switching circuit 32 is kept in a crest value connection state until the timing when servo light reaches the start position Ps2 on the succeeding scanning trajectory. Alternatively, the switching circuit 32 may be returned to a differential connection state, in the case where the absolute value of a subtracted voltage signal becomes smaller than the threshold value Vsh during a time from the timing when servo light has reached the position Pe to the timing when servo light has reached the end position E, and a detection signal is not outputted.

Modification

In the modification, an arrangement for detecting a neutral position of the mirror actuator 100 is added to the arrangement of the embodiment.

Figure 12:
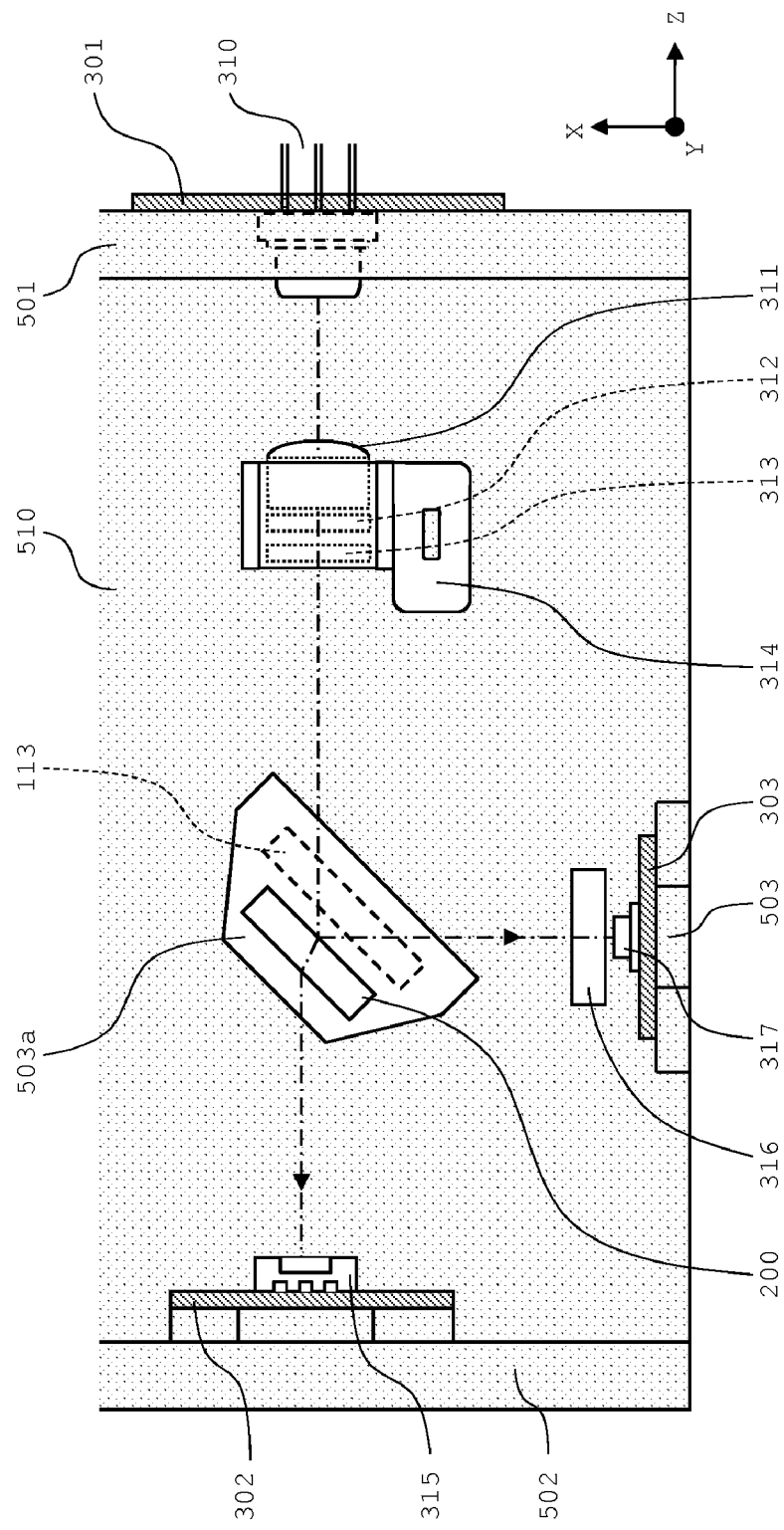
FIG. 12 is a diagram showing an optical system of the beam irradiation device, as a modification of the embodiment.

FIG. 12 is a partial plan view of the backside of the base 500 in the modification. As shown in FIG. 12, a wall 503, a circuit board 303, a slit 316, and a PD (Photo Detector) 317 are additionally provided to the arrangement of the embodiment. The wall 503 is formed in the vicinity on the backside of the base 500. The circuit board 303 mounted with the PD 317 is mounted in the vicinity of the wall 503.

Out of the servo light to be entered into the transparent member 200, servo light which is slightly reflected on the incident surface of the transparent member 200 (hereinafter, called as "reflection light") is entered into the incident surface of the slit 316. When the mirror 113 is set to a neutral position, reflection light to be entered into the slit 316 passes through a slit hole 316a formed through an incident surface and an exit surface of the slit 316, without being blocked by the incident surface of the slit 316, and is received by the PD 317. Accordingly, a detection signal is outputted from the PD 317.

Figure 13B:
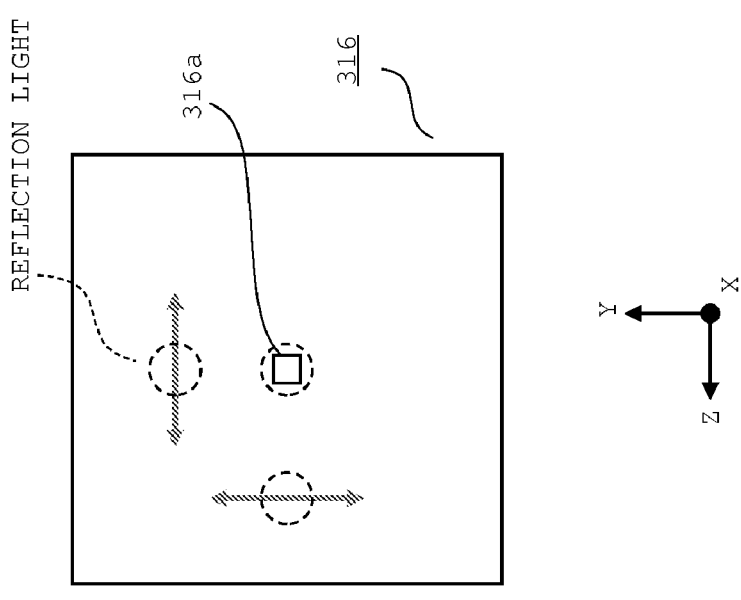
FIGS. 13A and 13B are diagrams showing a slit in the modification.
Figure 13A:
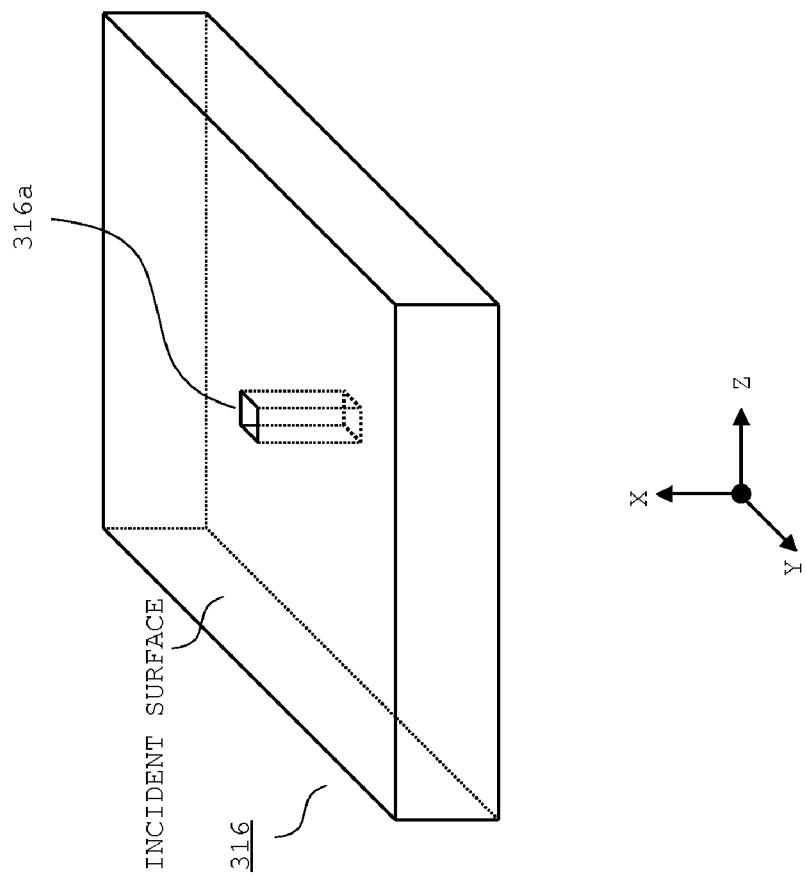

FIG. 13A is a diagram showing an arrangement of the slit 316. The incident surface of the slit 316 is formed as a light blocking surface. Further, the slit 316 has the slit hole 316a formed through the incident surface and the exit surface of the slit 316. The slit hole 316a is formed in the center of the slit 316. Referring to FIG. 13A, as the length of the slit hole 316a in X-axis direction is increased, the angle precision is enhanced. Accordingly, the length of the slit hole 316a in X-axis direction is determined depending on a required angle precision.

FIG. 13B is a diagram of the slit 316, viewed from the incident surface side of the slit 316. As shown in FIG. 13B, reflection light is moved in upward and downward directions and leftward and rightward directions on the incident surface of the slit 316 in accordance with driving of the mirror actuator 100. When the mirror 113 is positioned to the neutral position, reflection light is entered into the slit hole 316a. The slit 316 is formed at such a position that the optical axis of reflection light is aligned with the center of the slit hole 316a when the mirror 113 is set to the neutral position. The slit hole 316a has a size slightly smaller than the beam size of reflection light to be entered into the silt 316 when the mirror 113 is set to the neutral position.

With the slit 316 having the above configuration, it is possible to detect that the mirror 113 is set to the neutral position, based on a light receiving signal to be outputted from the PD 317. Specifically, the position of the mirror 113 when the light receiving signal has a peak value is detected as the neutral position. Accordingly, the mirror actuator 100 can accurately drive the mirror 113 to the neutral position.

Figure 14:
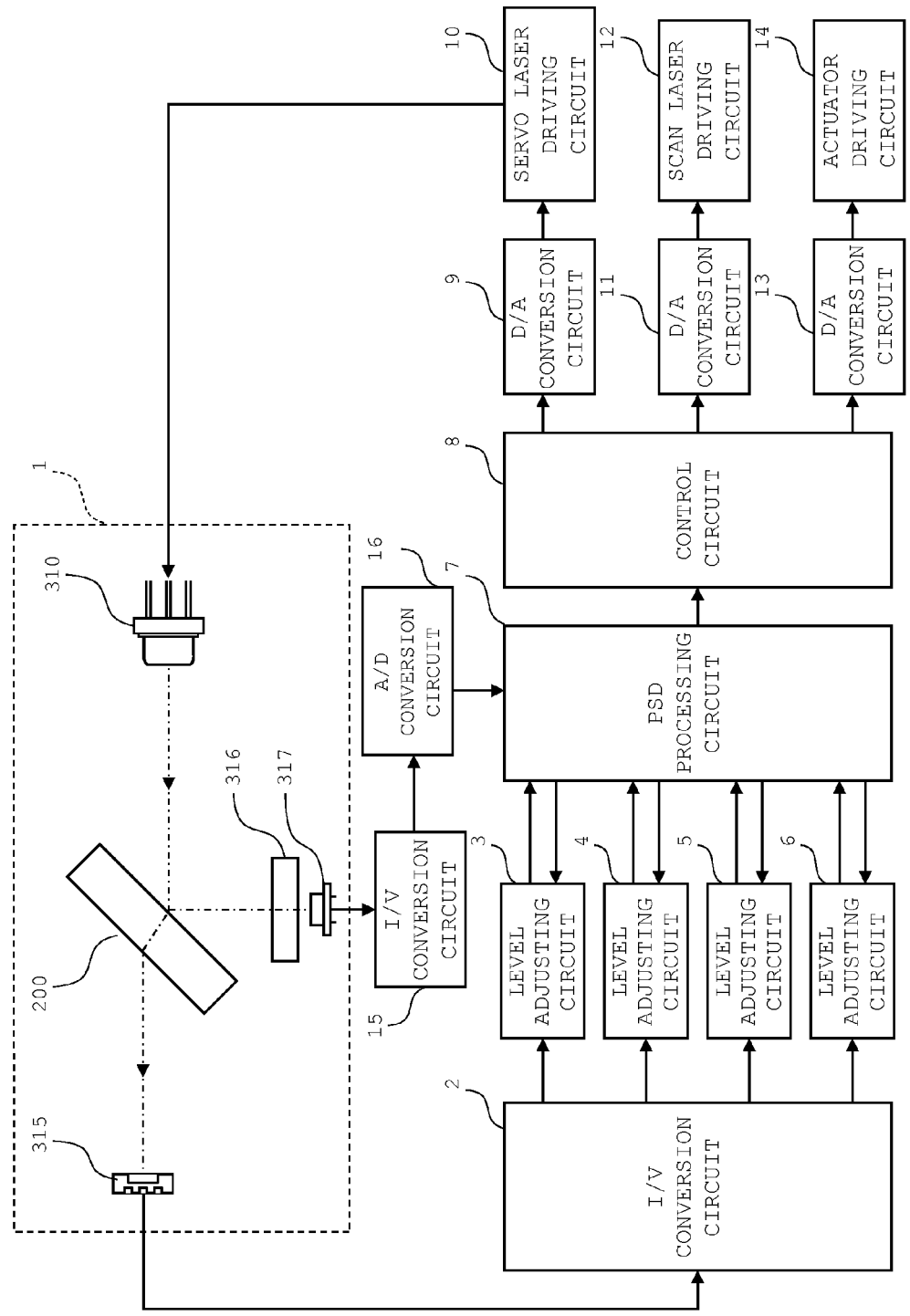
FIG. 14 is a diagram showing a circuit configuration of the beam irradiation device in the modification.

FIG. 14 is a diagram showing a circuit configuration of the beam irradiation device in the modification. In the modification, an I/V conversion circuit 15 and an A/D conversion circuit 16 are additionally provided to the arrangement of the embodiment.

The I/V conversion circuit 15 converts a current signal to be inputted from the PD 317 into a voltage signal, and outputs the voltage signal to the A/D conversion circuit 16. The A/D conversion circuit 16 converts the voltage signal inputted from the I/V conversion circuit 15 into a digital signal, and outputs the digital signal to the PSD processing circuit 7.

Before starting a scanning operation of scanning laser light with respect to a targeted area, the control circuit 8 drives the semiconductor laser 310 to emit servo light. Then, the control circuit 8 drives the actuator driving circuit 14 to perform a searching operation of the neutral position. Specifically, the control circuit 8 drives the mirror actuator 100 so that the mirror 113 is driven in a whole movable range of the mirror 113. Alternatively, assuming that the mirror 113 is located at a substantially neutral position, the searching operation may be performed in a range including the vicinity of the neutral position.

During the searching operation, the PSD processing circuit 7 sets the switching circuit 32 in each of the level adjusting circuits 3 through 6 to a crest value connection state, and acquires an input voltage signal to be inputted from the A/D conversion circuit 37. In this state, the PSD processing circuit 7 monitors a signal from the A/D conversion circuit 16, and acquires an input voltage signal from each of the level adjusting circuits 3 through 6, when the magnitude of the signal is maximized, as an input voltage signal at the neutral position. Thus, upon receiving the input voltage signal at the neutral position, the PSD processing circuit 7 outputs, to the control circuit 8, a signal indicating that the mirror 113 is set to the neutral position.

Next, a case is described, wherein an error component is superimposed on an input voltage signal.

Figure 15B:
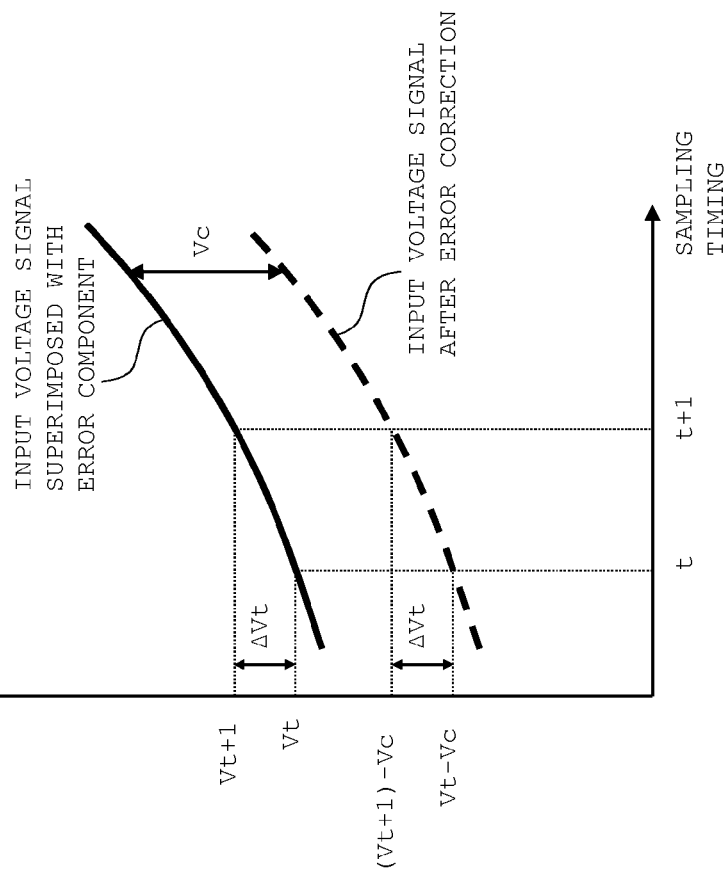
FIGS. 15A and 15B are diagrams showing an input voltage signal superimposed with an error in the modification.
Figure 15A:
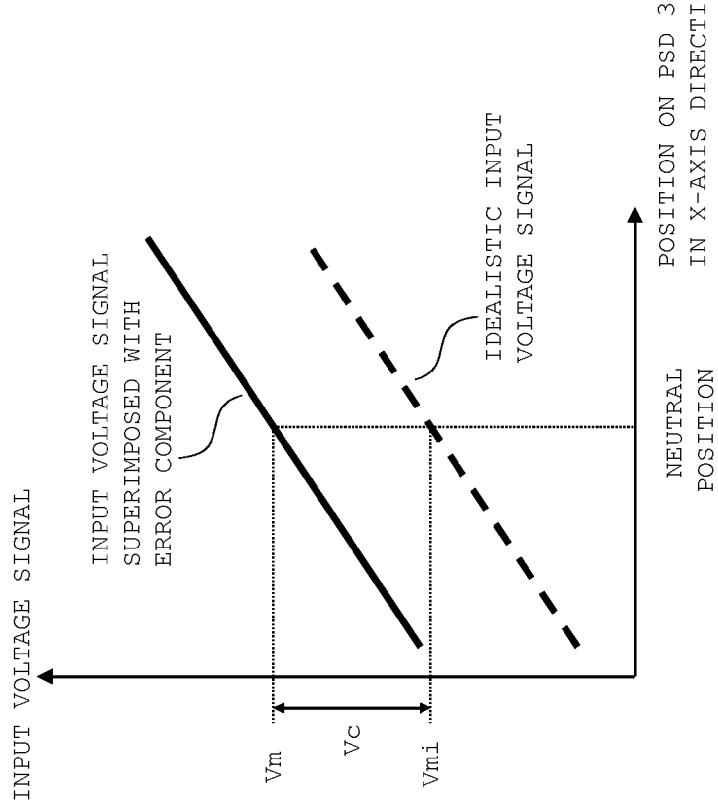

FIG. 15A is a diagram showing a change in the input voltage signal, in the case where the incident position of servo light is changed on the PSD 315. To simplify the description, in this section, a change in the input voltage signal to be outputted from the amplifier 31 in the level adjusting circuit 4 is described out of the level adjusting circuits 3 through 6.

Referring to FIG. 15A, the axis of abscissas indicates a position of the PSD 315 in X-axis direction, and the axis of ordinate indicates an input voltage signal. Further, the broken line in FIG. 15A indicates an idealistic input voltage signal, in the case where an error component is not superimposed on the PSD 315, and the solid line in FIG. 15A indicates an input voltage signal, in the case where an error component is superimposed on the PSD 315, and the input voltage signal is drifted from the idealistic input voltage signal by Vc in upward direction. Examples of a cause of the error include electrical drift, external ambient light, power fluctuation of servo light, and a dark current of the PSD 315.

In the case where an error component is superimposed on an input voltage signal, the error signal is superimposed on a voltage signal to be inputted to the buffer 7c, with the result that the error component is also superimposed on a voltage signal to be inputted to the signal computing circuit 7b. Accordingly, a position detection signal to be outputted from the signal computing circuit 7b may indicate a position different from the actual incident position of servo light to be entered into the light receiving surface of the PSD 315.

In view of the above, in the modification, by performing the following correction based on an input voltage signal which has been acquired at the time of detecting the neutral position, an input voltage signal free of an error component is outputted to the signal computing circuit 7b.

First, the PSD processing circuit 7 acquires an input voltage signal when the mirror 113 is set to the neutral position according to the above procedure. In the example shown in FIG. 15A, since an error component is superimposed on an input voltage signal, the input voltage signal is set to Vm.

In the above state, the PSD processing circuit 7 holds in advance an idealistic input voltage signal Vmi, in which an error component is not superimposed, at the time when the mirror actuator 100 drives the mirror 113 to the neutral position; and acquires an error component Vc by performing a computation: Vc=Vm−Vmi, using the input voltage signal Vmi, and the input voltage signal Vm at the neutral position, which has been acquired at the time of the searching operation.

As shown in FIG. 15A, considering a characteristic of the PSD 315, an error component detected at the time when the mirror 113 is set to the neutral position is substantially equal to an error component corresponding to a difference between the actual input voltage signal and the idealistic input voltage signal, in the case where the mirror 113 is set to a position other than the neutral position. Accordingly, no matter where the mirror 113 is located, the idealistic input voltage signal can be obtained by subtracting the error component Vc from an actual input voltage signal.

The PSD processing circuit 7 obtains a proper input voltage signal by subtracting the error component Vc from an actual input voltage signal, and stores the obtained input voltage signal into the memory 7a. By the above correction, the memory 7a is allowed to store an input voltage signal free of an error component. The PSD processing circuit 7 generates and outputs a position detection signal by performing the computations expressed by the equations (1) and (2), based on the above-mentioned input voltage signal.

Figure 16:
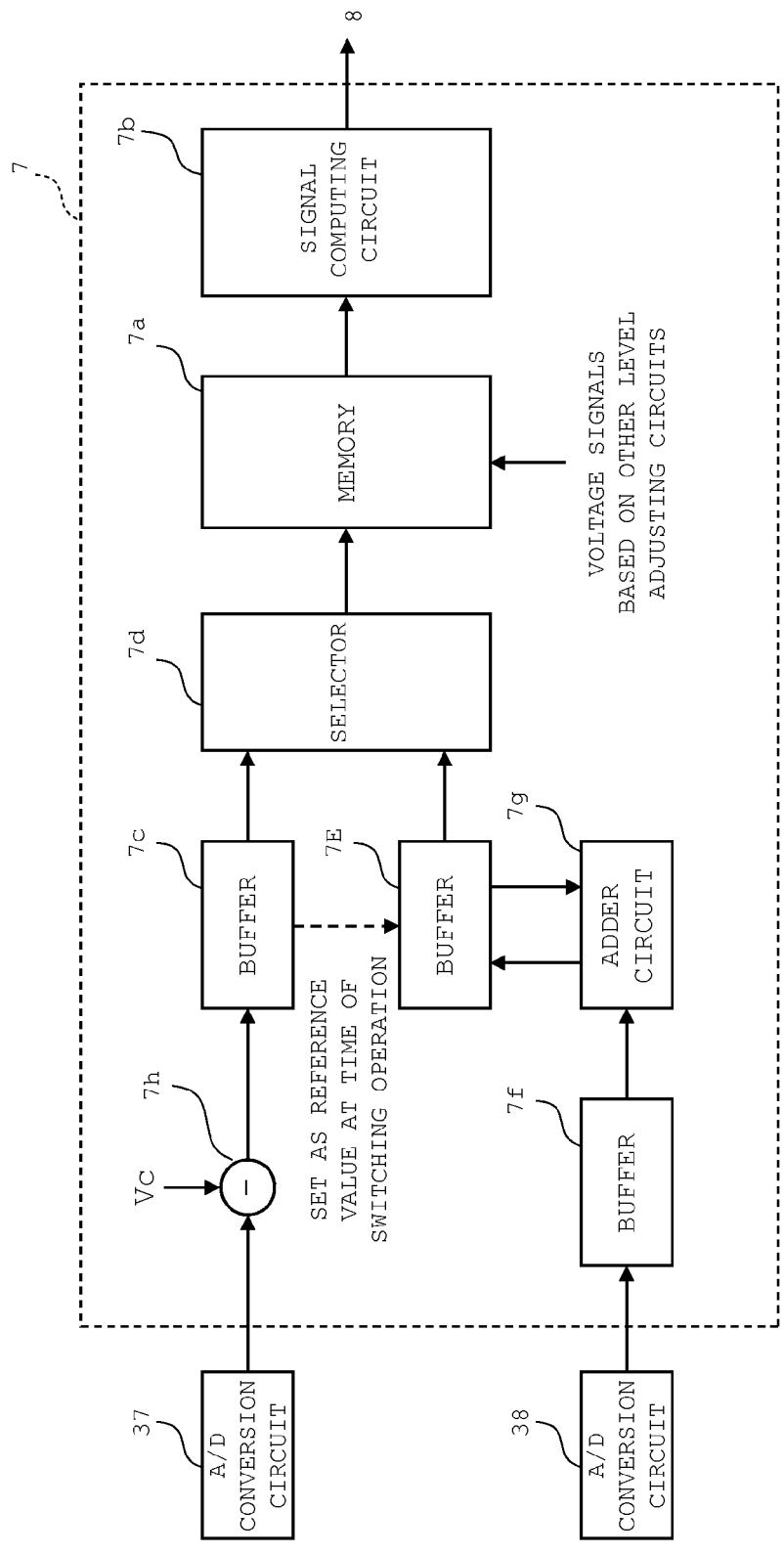
FIG. 16 is a diagram showing essential circuit elements in a PSD processing circuit in the modification.

FIG. 16 is a diagram showing an arrangement of the PSD processing circuit 7 in the modification.

As described above, the PSD processing circuit 7 acquires the input voltage signal Vm at the neutral position by the above searching operation, and acquires the error component Vc based on the acquired input voltage signal Vm and the idealistic input voltage signal Vmi which has been held in advance in the PSD processing circuit 7. The acquiring operation may be performed immediately after activation of the device, or at a timing when scanning laser light does not scan a targeted area, in addition to a timing before scanning by scanning laser light, as described above.

After the error component Vc is acquired, scanning by scanning laser light is started, and the switching circuit 32 in the level adjusting circuit 4 is set to a crest value connection state. Accordingly, an input voltage signal is inputted from the A/D conversion circuit 37 to the PSD processing circuit 7 at each of the sampling timings. The input voltage signal includes the error component Vc as described above.

In the modification, a subtractor 7h is provided between the A/D conversion circuit 37 and the buffer 7c. The error component Vc acquired by the searching operation is inputted to the subtractor 7h. The subtractor 7h subtracts the error component Vc from the input voltage signal to be inputted from the A/D conversion circuit 37, and outputs a subtraction result to the buffer 7c. Thus, an input voltage signal obtained by removing the error component Vc from the input voltage signal is stored in the buffer 7c. Accordingly, an input voltage signal free of an error component is stored into the memory 7a.

Thereafter, in response to a switching operation of the switching circuit 32 from a crest value connection state to a differential connection state, an input voltage signal that has been stored in the buffer 7c immediately before the switching operation is stored in the buffer 7e. In this state, the input voltage signal to be stored in the buffer 7e is an input voltage signal obtained by removing an error component by the subtractor 7h. Further, an error component is not superimposed on a subtracted voltage signal, as shown in FIG. 15B. In other words, a difference in input voltage signal between the sampling timing (t) and the sampling timing (t+1) is ΔVt irrespective of presence or absence of an error.

Accordingly, similarly to the embodiment, in the case where the connection state of the switching circuit 32 is switched over to a differential connection state, a subtracted differential signal inputted from the A/D conversion circuit 38 is simply accumulatively added to an input voltage signal which has been stored in the buffer 7e and is free of an error component. Accordingly, as shown in FIG. 16, in the modification, the circuit configuration from the A/D conversion circuit 38 to the buffer 7e is substantially the same as that of the embodiment.

As described above, in the modification, even if an error component is superimposed on an input voltage signal resulting from e.g. electrical drift, external ambient light, power fluctuation of servo light, or a dark current of the PSD 315, it is possible to store an input voltage signal removed of an influence of an error component into the memory 7a. Accordingly, in addition to the effect of the embodiment, the modification enables to generate a high-precision position detection signal, because the precision of a voltage signal to be outputted to the signal computing circuit 7b in the PSD processing circuit 7 is enhanced.

As described referring to FIG. 16, in the case where the connection state of the switching circuit 32 is set to a differential connection state in the modification, it is possible to store an input voltage signal free of the error component Vc into the memory 7a, without performing an operation of subtracting the error component Vc. The above arrangement enables to supply a high-precision position detection signal to the control circuit 8, while reducing a processing load of the PSD processing circuit 7 at the time of setting the switching circuit 32 to a differential connection state.

In the foregoing, the embodiment of the invention and the modification are described. The invention is not limited to the foregoing embodiment and the foregoing modification, and the embodiment of the invention may be changed in various ways other than the above.

For instance, in the embodiment and the modification, a semiconductor laser is used as a light source of servo light. Alternatively, an LED (Light Emitting Diode) may be used, in place of the semiconductor laser.

In the embodiment and the modification, laser light is allowed to scan a targeted area by driving the mirror 113. Alternatively, a lens may be used in place of the mirror 113, and the lens may be two-dimensionally driven to scan a targeted area with laser light. In the above modification, for instance, a light source for emitting servo light may be disposed on a lens holder to receive the servo light from the light source on the PSD. Further alternatively, a part of laser light transmitted through the lens may be separated by a beam splitter, and the laser light after the separation may be received on the PSD as servo light. In the latter modification, it is necessary to provide an arrangement, wherein the laser light source emits weak light, and the emission power of the laser light source is increased to emit pulse light at an irradiation timing onto the targeted area so that the servo light is constantly guided to the PSD.

In the embodiment and the modification, the propagating direction of servo light is changed by using the transparent member 200. Alternatively, a servo mirror may be mounted on the pivotal shaft 112 of the mirror actuator 100, in place of the transparent member 200, to change the propagating direction of servo light by reflecting the servo light on the servo mirror. Further alternatively, a light source for emitting servo light may be disposed on the mirror holder 110, the pivotal shaft 111, or the pivotal shaft 112.

In the embodiment and the modification, the A/D conversion circuits 37 and 38 are disposed immediately in front of the PSD processing circuit 7. Alternatively, the A/D conversion circuits 37 and 38 may be arranged in the PSD processing circuit 7.

In the modification, the neutral position of the mirror 113 is detected by an optical system incorporated with the slit 316. Alternatively, the position of the mirror 113 may be detected by arranging limit switches at limit positions of pivotal ranges of the mirror actuator 100 about X-axis and Y-axis, respectively. The above modification enables to detect that the pivotal position of the mirror 113 is located at the limit position by activation of the limit switch when the mirror 113 is pivotally moved to the limit position about X-axis or Y-axis. In the above modification, an idealistic input voltage signal, in which an error component is not superimposed when the mirror 113 is located at the limit position, is stored into the memory 7a in the PSD processing circuit 7. Then, the mirror 113 is pivotally moved toward the respective limit positions during a searching operation, and an input voltage signal when the limiter switch is turned on is acquired. Then, an error component is acquired based on a difference between the acquired input voltage signal and the idealistic input signal. Correcting the input voltage signal using the error component enables to provide substantially the same effect as the modification.

In the embodiment and the modification, the PSD 315 is used as a photodetector for receiving servo light. Alternatively, a four-division sensor may be used in place of the PSD 315.

Figure 17:
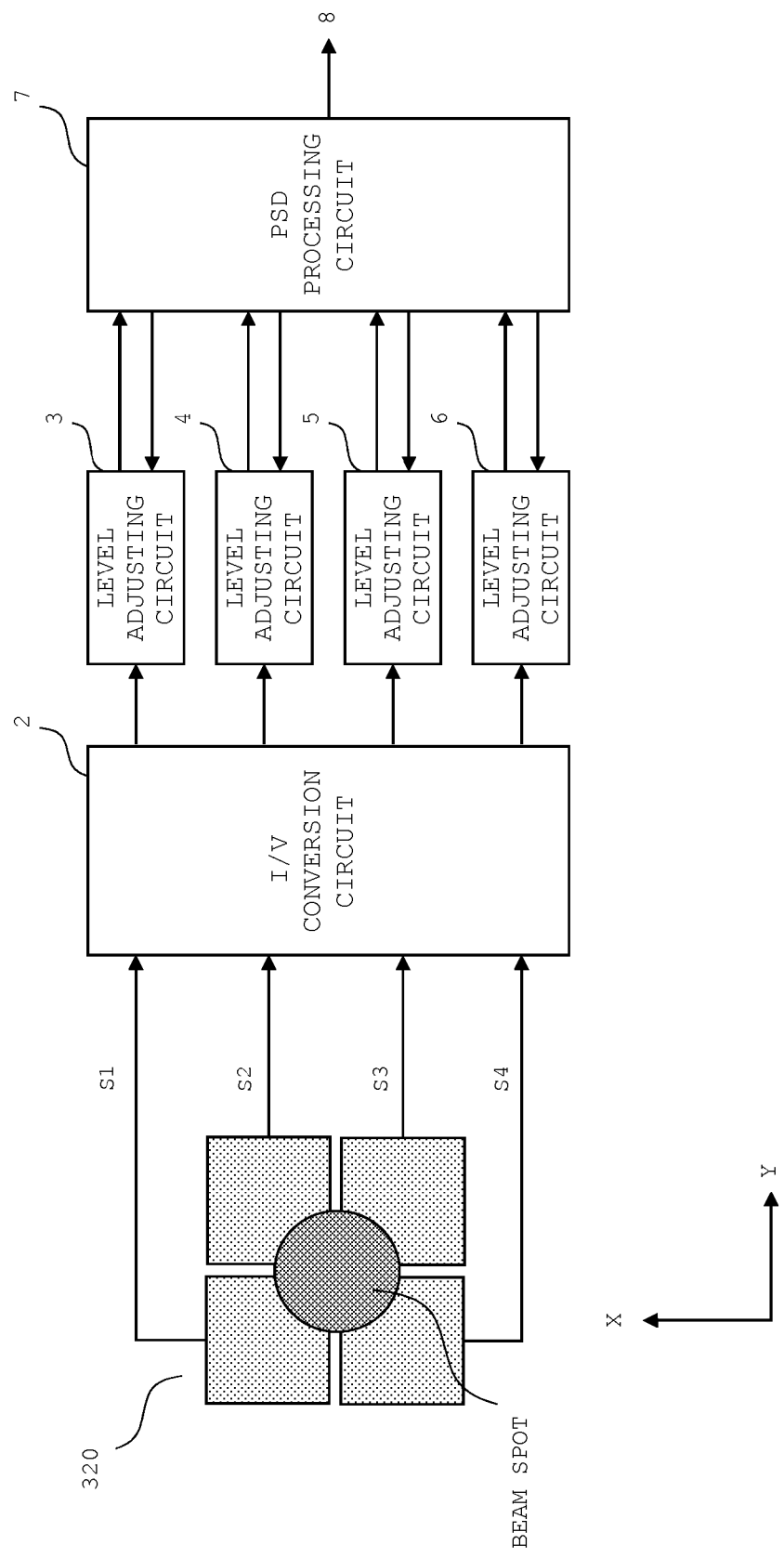
FIG. 17 is a diagram showing a photodetector and a circuit configuration, as another modification of the embodiment.

FIG. 17 is a diagram showing an arrangement, in the case where a four-division sensor 320 is used as a photodetector for receiving servo light. When the mirror 113 is set to the neutral position, servo light is irradiated onto a center position of the four-division sensor 320. When servo light is irradiated onto the four-division sensor 320, sensing portions of the four-division sensor 320 output current signals S1, S2, S3, and S4, respectively, as shown in FIG. 17.

After the current signals S1 through S4 are outputted to the I/V conversion circuit 2, the current signals S1 through S4 are subjected to a signal processing in the same manner as the embodiment. Specifically, the current signals S1 through S4 are converted into voltage signals by the I/V conversion circuit 2, and the voltage signals are outputted to the level adjusting circuits 3 through 6, respectively. The level adjusting circuits 3 through 6 output an input voltage signal or a subtracted voltage signal to the PSD processing circuit 7 depending on a switching operation of the switching circuit 32 between a crest value connection state and a differential connection state. The PSD processing circuit 7 processes the input voltage signal or the subtracted voltage signal in the similar manner as described above, and stores voltage signals Sv1, Sv2, Sv3, and Sv4 corresponding to the current signals S1, S2, S3, and S4 into the memory 7a. Further, the signal computing circuit 7b in the PSD processing circuit 7 generates a position detection signal of servo light to be entered into the four-division sensor 320, based on the voltage signals Sv1 through Sv4.

In the above arrangement, the signal computing circuit 7b calculates an incident position (x) of servo light in X-direction, and an incident position (y) of servo light in Y-direction by e.g. the following equations (3) and (4), based on the voltage signals Sv1 through Sv4.

$$\frac{(Sv1 + Sv2) - (Sv3 + Sv4)}{Sv1 + Sv2 + Sv3 + Sv4} = x \quad (3)$$

$$\frac{(Sv1 + Sv4) - (Sv2 + Sv3)}{Sv1 + Sv2 + Sv3 + Sv4} = y \quad (4)$$

Then, a position detection signal indicating the incident position of servo light that has been calculated by the equations (3) and (4) is outputted to the control circuit 8.

In the above case, similarly to the aforementioned modification, it is possible to remove an error component that has been superimposed on the current signals S1 through S4 to be outputted from the four-division sensor 320, based on a difference between an input voltage signal to be inputted to the PSD processing circuit 7 when the mirror 113 is set to the neutral position, and an idealistic input voltage signal that is held in advance in the memory 7a. Accordingly, a high-precision position detection signal can be obtained by the signal computing circuit 7b.

The embodiment of the invention may be changed or modified in various ways as necessary, as far as such changes and modifications do not depart from the scope of the present invention hereinafter defined.

What is claimed is:

1. A beam irradiation device comprising:
   a laser light source for emitting laser light;
   an actuator for scanning a targeted area with the laser light;
   a servo optical system for emitting servo light, and changing a propagating direction of the servo light in accordance with driving of the actuator;
   a photodetector for receiving the servo light, and outputting a detection signal depending on a light receiving position of the servo light;
   a signal processing section for generating a position detection signal based on the detection signal; and a control section for controlling the laser light source and the actuator based on the position detection signal, wherein the signal processing section includes:
- a differential acquiring section for acquiring a difference between two sampling values obtained by sampling the detection signal at two consecutive sampling timings;
- a first A/D converting section for converting the difference into a digital signal; and
- a first computing section for computing the position detection signal, based on the difference which has been converted into the digital signal by the first A/D converting section.

2. The beam irradiation device according to claim 1, wherein the signal processing section includes:
- a second A/D converting section for converting a sampling value obtained by sampling the detection signal at a predetermined sampling timing into a digital signal;
- a second computing section for computing the position detection signal, based on the sampling value which has been converted into the digital signal by the second A/D converting section; and
- a selecting section for supplying, to the control section, the position detection signal which has been computed by one of the first computing section and the second computing section, the selecting section supplying, to the control section, the position detection signal computed by the first computing section, in the case where the laser light scans the targeted area.

3. The beam irradiation device according to claim 2, wherein the selecting section supplies, to the control section, the position detection signal computed by the second computing section, in the case where the difference exceeds a threshold value equal to or smaller than a maximum value of an allowable conversion range of the first A/D converting section, in scanning the targeted area with the laser light.

4. The beam irradiation device according to claim 2, further comprising:
- a position detecting section for detecting a driving position of the actuator being set to a reference position; and
- an error detecting section for detecting, as an error component, a difference between a sampling value of the detection signal to be obtained when the driving position of the actuator is set to the reference position, and an idealistic value of the detection signal, wherein the second computing section computes the position detection signal, based on a signal value obtained by removing the error component from the sampling value which has been converted into the digital signal by the second A/D converting section.

5. The beam irradiation device according to claim 4, wherein the position detecting section includes:
- a light receiving element for receiving a part of the servo light as position detecting light; and
- an optical element for allowing the position detecting light to enter into the light receiving element when the driving position of the actuator is set to the reference position.

* * * * *